US008979041B2

(12) United States Patent
Hennessey et al.

(10) Patent No.: US 8,979,041 B2
(45) Date of Patent: Mar. 17, 2015

(54) APPARATUS FOR SUPPORTING A TABLET

(71) Applicants: James R. Hennessey, West Hartford, CT (US); James Robinson, Wolcott, CT (US)

(72) Inventors: James R. Hennessey, West Hartford, CT (US); James Robinson, Wolcott, CT (US)

(73) Assignee: The Music People, Inc., Berlin, CT (US)

( * ) Notice: Subject to any disclaimer, the term of this patent is extended or adjusted under 35 U.S.C. 154(b) by 0 days.

(21) Appl. No.: 14/155,102

(22) Filed: Jan. 14, 2014

(65) Prior Publication Data

US 2014/0138507 A1      May 22, 2014

Related U.S. Application Data

(63) Continuation of application No. 13/342,424, filed on Jan. 3, 2012, now abandoned, and a continuation-in-part of application No. 13/344,946, filed on Jan. 6, 2012, now abandoned.

(Continued)

(51) Int. Cl.

| *F16M 11/00* | (2006.01) |
|---|---|
| *F16M 13/02* | (2006.01) |
| *F16M 11/14* | (2006.01) |
| *F16M 11/24* | (2006.01) |
| *F16M 13/00* | (2006.01) |
| *G06F 1/16* | (2006.01) |

(52) U.S. Cl.
CPC ............. *F16M 13/022* (2013.01); *F16M 11/14* (2013.01); *F16M 11/24* (2013.01); *F16M 13/00* (2013.01); *G06F 1/1626* (2013.01); *G06F 2200/1633* (2013.01)

USPC ................ 248/122.1; 248/181.1; 248/288.31; 248/309.1

(58) Field of Classification Search
CPC ...... F16M 13/022; F16M 13/00; F16M 11/24; F16M 11/14; F16M 11/046; G06F 2200/1633; F16B 2/065; F16B 7/0446
USPC ........... 248/276.1, 309.1, 288.31, 121, 122.1, 248/629, 229.21, 229.25, 181.1; 206/320
See application file for complete search history.

(56) References Cited

U.S. PATENT DOCUMENTS

| 2,650,788 A | * | 9/1953 | Hulstein | ................. 248/231.71 |
| 3,012,798 A | * | 12/1961 | Berger | ........................ 285/264 |

(Continued)

OTHER PUBLICATIONS

Criskenna Xclip the iPad Media Stand; http://www.criskenna.com/, Jul. 13, 2011.

(Continued)

*Primary Examiner* — Anita M King
(74) *Attorney, Agent, or Firm* — St. Onge Steward Johnston & Reens LLC

(57) ABSTRACT

An apparatus for supporting a tablet includes a case for receiving the tablet. A swivel includes a socket and a ball disposed and retained therein. The ball is selectively rotatable relative to the socket. The ball is coupled to the case and the socket is coupled to a mounting post. The mounting post is releasably fixed to a mounting bar. The mounting bar defines a mounting slot configured to fix the apparatus relative to a structure, such as a microphone stand or the like. The apparatus includes clamping mechanisms to enable a user to selectively fix and release the components of the apparatus such that a user can configure and fix the apparatus to a desired position for interfacing with the tablet, and then lock the apparatus in that desired position.

20 Claims, 20 Drawing Sheets

Related U.S. Application Data

(60) Provisional application No. 61/752,236, filed on Jan. 14, 2013, provisional application No. 61/752,207, filed on Jan. 14, 2013, provisional application No. 61/752,712, filed on Jan. 15, 2013, provisional application No. 61/752,722, filed on Jan. 15, 2013, provisional application No. 61/753,702, filed on Jan. 17, 2013, provisional application No. 61/753,688, filed on Jan. 17, 2013.

(56) References Cited

U.S. PATENT DOCUMENTS

| | | | |
|---|---|---|---|
| 5,673,628 A * | 10/1997 | Boos | 108/44 |
| 5,704,577 A * | 1/1998 | Gordon | 248/229.2 |
| 6,774,293 B2 | 8/2004 | Hsieh | |
| 6,796,536 B1 * | 9/2004 | Sevier, IV | 248/121 |
| 6,957,795 B1 | 10/2005 | Hsieh | |
| 7,005,568 B2 * | 2/2006 | Hsieh | 84/422.1 |
| 7,938,372 B2 * | 5/2011 | Macleod | 248/122.1 |
| 7,984,886 B2 * | 7/2011 | Lin | 248/181.1 |
| 8,020,829 B1 * | 9/2011 | Tamayori | 248/447.2 |
| 8,636,257 B2 * | 1/2014 | Tsou et al. | 248/288.31 |
| 2002/0066837 A1 * | 6/2002 | Dunbar | 248/122.1 |
| 2003/0037662 A1 | 2/2003 | Hsieh | |
| 2013/0175409 A1 * | 7/2013 | Hennessey et al. | 248/74.1 |

OTHER PUBLICATIONS iKlip—Universal microphone stand adapter for iPad and iPad2; http://www.ikmultimedia.com/iklip/features/, Nov. 30, 2011.

* cited by examiner

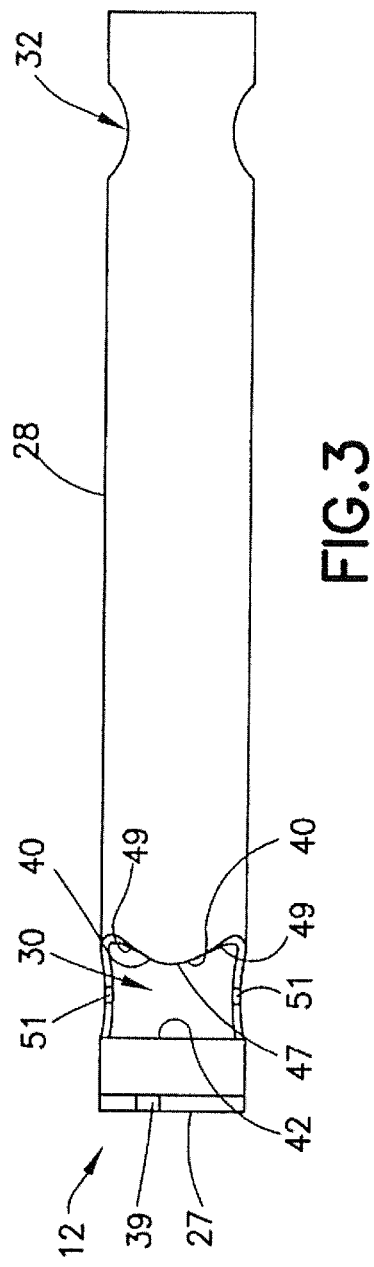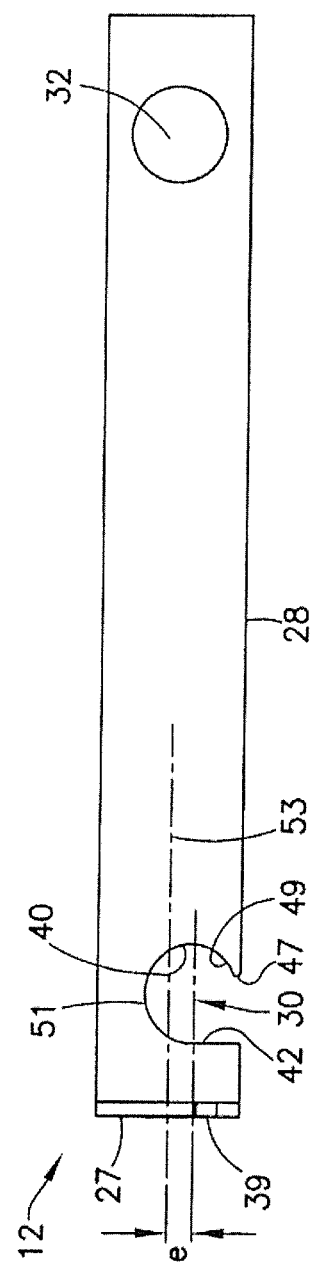

APPARATUS FOR SUPPORTING A TABLET

FIELD OF THE INVENTION

The present disclosure relates to an apparatus for supporting a tablet. Additionally, the present disclosure relates to mounting devices generally.

BACKGROUND OF THE INVENTION

A tablet computer, or simply a tablet, is a mobile computer with display, circuitry and battery in a single unit. Tablets are equipped with sensors, such as a camera, microphone, accelerometer, and touchscreen. Tablets may include physical buttons, e.g., to control basic features such as speaker volume and power and ports for network communications and to charge the battery. An on-screen, pop-up virtual keyboard may be used for typing. Tablets are typically larger than smart phones at 7 inches or larger, measured diagonally. Apple, Inc., for example, sells a popular line of tablets under the brand name iPad.

Tablets are used in a variety of applications including the display of music, the provision of controls for monitoring and adjusting recording equipment or electronic instruments, the display of reading material, and the display of video, to name just a few examples. During use, the tablet is typically held in the user's hand(s) or supported on a flat surface. It is known in the art to receive a tablet in a case. Some known cases are configurable to support the tablet in different positions, for example upright on table, to facilitate use of the tablet.

As disadvantage of known cases for supporting tablets is that they do not provide a good solution for certain activities, particularly when a user must simultaneously use her hands for another task. For example, during a musical performance a guitar player may stand on a stage. A disadvantage of known cases is that they do not provide a sufficient support for the tablet because it may be too far from the performer, or in an inconvenient position.

SUMMARY OF THE INVENTION

The present invention resides in one aspect in an apparatus for supporting a tablet. The apparatus comprises a case configured to receive a tablet, the case having a receiving plate. A swivel comprising a socket and a ball disposed and retained in the socket, the ball being rotatable relative to the socket and having a stud extending from a surface of the ball. A distal end of the stud is coupled to the receiving plate. A mounting post extends along a longitudinal axis between a first end and a second end. The first end of the mounting post is coupled to the swivel. A mounting bar extends along a longitudinal axis between a first end and a second end. The mounting bar defines an elliptical outer surface in a cross sectional plane perpendicular to the longitudinal axis. The mounting bar is hollow and has an inside diameter and an outside diameter. The mounting bar defines a through hole proximate to the second end. The second end of the mounting post is received in the through hole and is releasably fixed relative thereto.

The mounting bar in the above embodiment defines a mounting slot proximate to the first end. The mounting slot comprises a bottom surface and a first radius of curvature extending from the bottom surface. The first radius of curvature has a first bearing edge defining a first elliptically enveloping surface and a second bearing edge defining a second elliptically enveloping surface. The first bearing edge and the second bearing edge converge to a leading edge. The leading edge is configured to facilitate retention of an item received in the mounting slot against the first and second bearing edges. The mounting bar further comprising a first clamping mechanism, a portion of which extends into the first end of the mounting bar towards the first radius of curvature of the mounting slot. The first clamping mechanism is configured to engage an item having an elliptical outer surface positioned in the mounting slot, thereby urging the elliptical outer surface of the item against the first radius of curvature to releasably fix the mounting bar relative to the item by urging the item against the bearing edges and the leading edge.

In another embodiment of the present invention, the first clamping mechanism comprises a knob and a threaded shaft extending therefrom. The shaft is threadably engaged with the first end of the mounting bar and extends along an axis parallel to the longitudinal axis of the mounting bar. A distal end of the shaft extends into the mounting slot. A rotation of the knob of the first clamping mechanism relative to the mounting bar in a first direction translates the distal end of the shaft toward the first radius curvature of the mounting slot. A rotation of the knob of the first clamping mechanism relative to the mounting bar in a second direction translates the distal end of the shaft away from the first radius of curvature of the mounting slot.

In another embodiment of the present invention, a push pad is coupled to a distal end of the shaft of the first clamping mechanism. The push pad defines an elliptical surface configured to engage an item received in the mounting slot.

In yet another embodiment, an inside surface the mounting bar defines a guide slot extending along a length of the mounting bar proximate to the push pad. The push pad comprises a tab that is configured to travel in the guide slot when the push pad is translated along the longitudinal axis of the mounting bar via a rotation of the knob in the first or second direction.

In yet another embodiment of the present invention, a second clamping mechanism is coupled proximate to the second end of the mounting bar. The second clamping mechanism is configured to releasably fix the mounting post relative to the mounting bar. The second clamping mechanism comprises a knob and a shaft extending therefrom, the shaft is threadably engaged with the second end of the mounting bar and extends along an axis parallel to the longitudinal axis of the mounting bar. A distal end of the shaft extends into the through hole. A rotation of the knob of the second clamping mechanism relative to the mounting bar in a first direction translates the distal end of the shaft into the through hole to inhibit movement of the mounting post relative to the mounting bar. A rotation of the knob of the second clamping mechanism relative to the mounting bar in a second direction translates the distal end of the shaft away from through hole to facilitate movement of the mounting post relative to the mounting bar.

In yet another embodiment of the present invention, a third clamping mechanism is configured to selectively fix rotation of the ball relative to the socket. The third clamping mechanism comprises a knob and a shaft extending therefrom. The shaft is threadably engaged with the socket. A rotation of the knob of the third clamping mechanism relative to the socket in a first direction translates the distal end of the shaft into the socket to inhibit rotation of the ball relative to the socket. A rotation of the knob of the third clamping mechanism relative to the socket in a second direction translates the distal end of the shaft out of the socket to facilitate rotation of the ball relative to the socket.

The present invention resides in another aspect in an apparatus for supporting a tablet as substantially described above. In this embodiment, the mounting post is omitted and the second end of the mounting bar is coupled to the swivel.

The present invention resides in yet another aspect in a mounting bar that extends along a longitudinal axis between a first end and a second end. The mounting bar defines an elliptical outer surface in a cross sectional plane perpendicular to the longitudinal axis. The mounting bar is hollow and has an inside diameter and an outside diameter. The mounting bar defines a mounting slot proximate to the first end. The mounting slot comprises a bottom surface and a first radius of curvature extending from the bottom surface. The first radius of curvature has a first bearing edge defining a first elliptically enveloping surface and a second bearing edge defining a second elliptically enveloping surface. The first bearing edge and the second bearing edge converge to a leading edge. The leading edge is configured to facilitate retention of an item received in the mounting slot against the first and second bearing edges. The mounting bar further comprising a first clamping mechanism, a portion of which extends into the first end of the mounting bar towards the first radius of curvature of the mounting slot. The first clamping mechanism is configured to engage an item having an elliptical outer surface positioned in the mounting slot, thereby urging the elliptical outer surface of the item against the first radius of curvature to releasably fix the mounting bar relative to the item by urging the item against the bearing edges and the leading edge.

BRIEF DESCRIPTION OF THE DRAWINGS

FIG. 3 is a side view of the mounting bar shown in FIG. 2.

FIG. 4 is a top view of the mounting bar shown in FIG. 2.

DETAILED DESCRIPTION OF THE INVENTION

Figure 1:
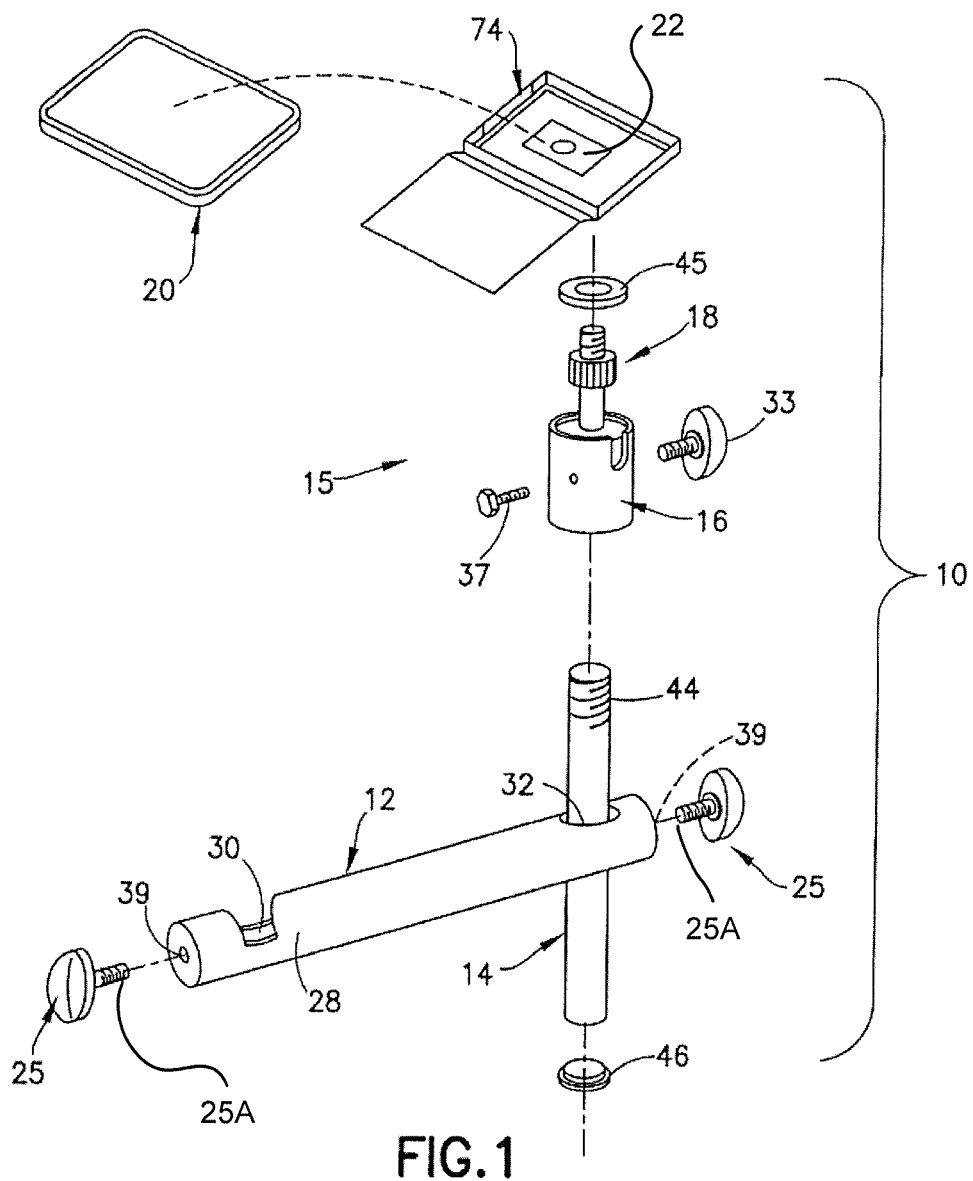
FIG. 1 is an exploded perspective view of an apparatus for supporting a tablet in accordance with one embodiment of the present invention.

As shown in FIG. 1, an apparatus 10 for supporting a tablet is shown. The apparatus 10 includes a mounting bar 12, a mounting post 14 configured to be coupled to the mounting bar 12, and a swivel member 15. The swivel member 15 includes a socket 16 having a ball 48 (labeled in FIG. 5) rotatably retained therein. A stud 18 (labeled in FIG. 5) extends from a surface of the ball. A distal end of the stud 18 comprises a first set of threads. The ball 48 is further illustrated in FIG. 5 and discussed below.

The apparatus 10 includes a case 74 configured to received and hold a tablet 20. The case 74 includes a receiving plate 22. The receiving plate 22 includes a hole having a plurality of threads being configured to engage with the first set of threads. A washer 45 is received over the distal end of the threaded stud to provide support for the case 74 in the mounted position on the threaded stud. The stud includes a collar portion proximate to the distal end thereof. The washer 45 is sandwiched between the receiving plate 22 and the collar when the stud is coupled to the case 20. The case 74 is configured to receive the tablet 20 so that the tablet is retained in the case in a plurality of different positions.

The mounting bar 12, mounting post 14, and swivel 15 can be readily assembled and disassembled, thereby defining system 10 as a kit. It should be understood that the present invention is not limited to a threaded connection between the stud and the receiving plate, and a person of ordinary skill in the art and familiar with this disclosure will understand that other suitable means of coupling may be employed such as, but not limited to, ball detents, quarter turn fasteners, bayonet-type couplings, and the like that enable the case 74 to be connected to the swivel 15.

The mounting bar 12 includes a body portion 28 defining a slot 30 adjacent to one end of the body portion. The body portion 28 may also define a through hole 32 adjacent an opposing end of the body portion. The present invention is not limited in this regard, however, as slots 30 (or through holes 32) can be located proximate to either of the ends or anywhere there between.

The mounting bar 12 is configured to couple to an existing support, such a microphone stand. In the disclosed embodiment, the mounting bar 12 is configured to be coupled via the slot 30 to an existing support have a circular cross section, however, the present invention is not limited in this regard. By coupling the mounting bar 12 to the tubing, rods, or bars of an existing support (e.g., microphone stand, a legged stand or base, a desk, exercise equipment, tray table, or the like) inserted into the slot 30, securing the mounting post 14 in the through hole 32 in the mounting bar 12, and coupling the tablet 20 to the swivel 15 on the mounting post 14, the apparatus 10 can be secured in place to support the tablet 20.

In the embodiment shown in FIG. 1, the mounting bar 12 is coupled to the support (not shown in FIG. 1) and the mounting post 14 is secured in the through hole 32 via threaded knobs 25 threadably engaged in threaded holes 39. By turning the threaded knobs 25, tips 25A defined by shaft portions of the knobs will engage the mounting post 14 and the tubing, rods, or bars of the existing support, thereby securing the mounting bar 12 to the existing support and securing the mounting post 14 in the through hole 32. Slots 30, however, provide for simpler mounting as compared to through holes 32 because coupling the mounting bar 12 to the existing support can be effected without removing devices (such as microphones) to allow the existing support to be inserted through the through hole 32.

The present invention is not limited to the use of the threaded knob 25, however, as other mechanisms such as toggle or spring loaded handles can also be employed without departing from the broader aspects of the present invention.

The mounting post 14 is defined by tubing sized and configured to be received in the through hole 32 of the mounting bar 12. More specifically, the mounting post 14 is of a diameter and length that allows it to be positioned in the through hole 32 at any point along the length of the mounting post and secured in the through hole via the threaded knob 25 or other clamping mechanism.

Still referring to FIG. 1, a thread 44 is formed on a distal end of the mounting post 14 to allow the mounting post to be threadedly received in the socket 16. The present invention is not so limited, however, as the socket 16 may be coupled to the mounting post 14 via any other suitable means. For example, the socket may be frictionally fit over the upper end of the mounting post, or the socket may be loosely fit over the upper end of the mounting post and clamped or otherwise non-rotatably fastened to the mounting post. A ball detent or quick release coupling may also be used. In the illustrated embodiment, the mounting post is a hollow tube having a cap 46 inserted into an end thereof. However, the present invention is not limited in this regard as the mounting post can also be solid, thereby obviating the need for a cap. Additionally, the mounting post is not limited to having a circular cross section, and may, for example have a rectilinear cross section. In such embodiments, it is preferred that the through hole has a rectilinear opening that corresponds to cross section of the mounting post.

Figure 5:
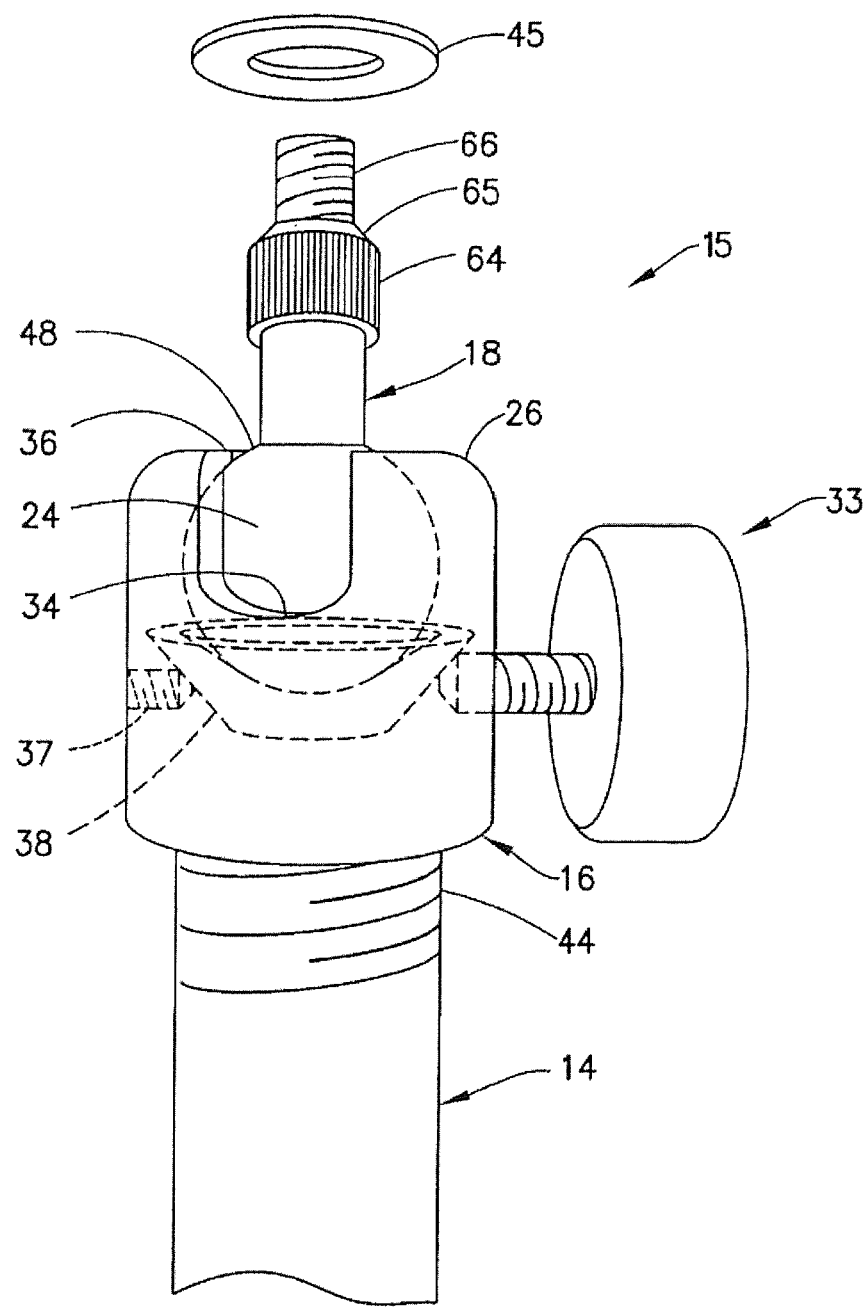
FIG. 5 is a side view of an attachment mechanism of the apparatus shown in FIG. 1.

In reference to FIG. 1 and to FIG. 5, the socket 16 is defined by a substantially cylindrical body portion that includes a receiving thread in a lower portion thereof for threadedly receiving the mounting post 14. An upper portion of the socket 16 is configured to capture and retain the ball 48 (labeled in FIG. 5). In the illustrated embodiment, a threaded knob 33 engages a threaded hole in the socket 16. A set screw 37 is positioned in the socket 16 substantially diametrically opposite the threaded hole receiving the threaded knob 33. A cup 38 is positioned in the socket 16. The cup 38, in the illustrated embodiment, has a frusto-conical shape so that as the threaded knob 33 is rotated, it pushes on the frusto-conical surface of the cup 38, which is also resting on an end of the set screw 37, causing it to move upward and engage a ball 48 forming the lower portion of the swivel 15, pushing the ball against a retaining lip (shown at 36 in FIG. 5) defined by the swivel, thereby releasably fixing the swivel's position. In this manner, the swivel provides a first configuration and a second configuration. In the first configuration, the threaded knob 33 is in a released position, allowing a user of the support apparatus to rotate and angle the position of a tablet received in the case relative to the mounting bar 14. In a second configuration, the threaded knob 33 is in an engaged position, thereby fixing the position of the ball 48 and the case 74, and tablet 22, relative to the end of the mounting post 14. In this manner, a user can adjust the tablet to a desired position and, after the desired position is achieved, fix the tablet in the desired position.

Figure 2:
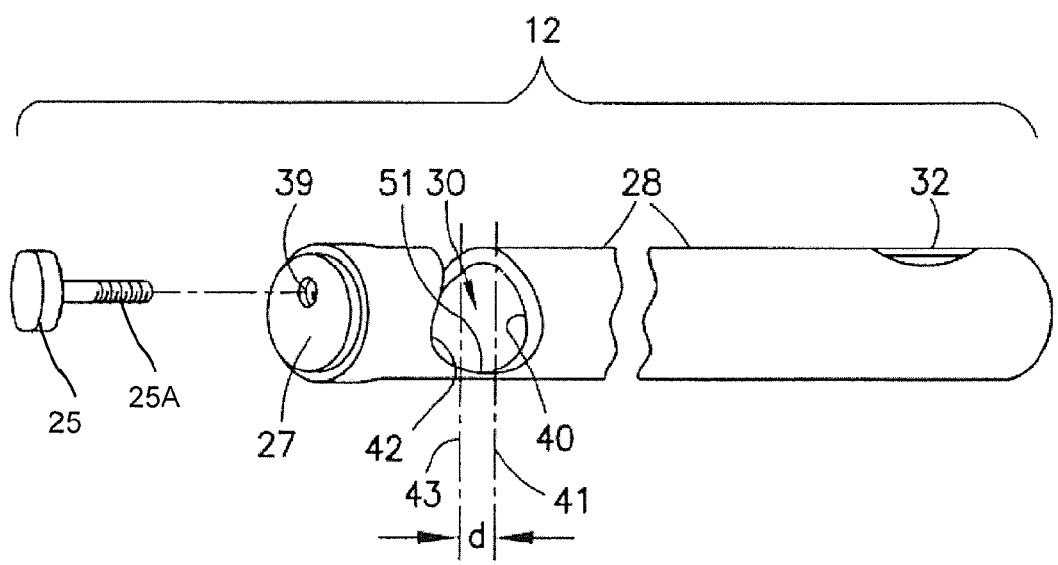
FIG. 2 is a perspective view a mounting bar of the apparatus shown in FIG. 1.

As shown in FIGS. 2-4, the slot 30 in the body portion 28 of the mounting bar 12. The slot 30, as shown in the illustrated embodiment, comprises an end portion defined by a first radius 40. The first radius 40 is also defined in part by a first centerline 41. A second end portion of the slot 30 is defined by a second radius 42 defined in part by a second centerline 43. In the illustrated embodiment, the first and second centerlines, 41 and 43 respectively, are separated by a distance designated by the reference letter "d."

The size of the first radius 40 and the length of the distance "d" is dependent on the size of the mounting bar 12 as well as the size of bar, tube, or other item that the mounting bar can be attached to. In the illustrated embodiment, the first radius 40 is tangent to a bottom surface 51 defined by the slot 30. While a second radius 42 has been described, the present invention is not limited in this regard as there can be instances where there is no second radius, but rather a substantially straight wall portion defined in part by a right angle, square corner, or other angle is without employed departing from the broader aspects of the present invention.

In the illustrated embodiment, the mounting bar 12 is hollow and an end cap 27 is positioned in the body portion to accommodate a clamping mechanism. The end cap 27 defines a threaded hole 39 extending through the end cap. The clamping mechanism comprises a knob 25 that includes a threaded shaft 25A extending outwardly therefrom. The threaded shaft 25A is threadably engageable with the threaded hole 39 and, as will be explained in greater detail below, engages and causes the item to which the mounting bar 12 is being coupled to engage the first radius 40. The present invention is not limited to the clamping mechanism comprising a knob 25 on a threaded shaft 25A engageable with a threaded hole 39, however, as other mechanisms may be employed. For example, the clamping mechanism can be a toggle clamp, ball detent, spring loaded piston, or the like. While mounting bar 12 has been described as being hollow, the present invention is not limited in this regard as the mounting bar can also be solid. In such a case, the end cap 27 would not be needed and the threaded hole 39 could be defined by the mounting bar 12.

Referring to FIGS. 3 and 4, the first radius 40 is defined by a leading edge 47 and two bearing edges 49. The leading edge 47 and the two bearing edges 49 are positioned to define the slot 30 such that the center point of the slot 30 is offset from a centerline 53 extending longitudinally through the mounting bar 12 by a distance "e" (FIG. 4). At least the two bearing edges 49 define elliptically enveloping surfaces that make contact with a matingly-shaped item ("the item") received in the slot 30. In offsetting the slot 30 by the distance "e," a suitable amount of material remains on the body portion 12 in the area surrounding the slot to enable the item to be supported. Upon operating the clamping mechanism 25A as shown by turning the threaded shaft 25C to cause the translation thereof through the threaded hole 39, the item positioned in the slot 14 is urged against the bearing edges 49 and elliptically enveloped such that the contact of the item with the bearing edges holds the item in place. The leading edge 47 further aids in releasably locking the item against the bearing edges 49. The present invention is not limited to the center point of the slot 30 being offset from the centerline 53 as shown, however, as other configurations are within the scope of the present invention.

The first radius 40 (and thus the leading edge 47 and the bearing edges 49) is sized and configured to accommodate an item having a cross-sectional dimension within a specific range and up to a particular diameter. For example, a first radius 40 in a body portion 28 having a one-inch diameter may be sized and configured to receive a second member of tubing having a cross-sectional diameter of 10-16 millimeters (mm). A first radius 40 in a body portion 28 having a larger diameter may be sized and configured to receive a second member of tubing having larger cross-sectional diameter (e.g., 17-25 mm or 26-36 mm). The present invention is not limited to the configuration as shown, however, as the slot could also be squared off to attach to a tray table or the like.

Still referring to FIGS. 3 and 4, a through hole 32 extends through the body portion 28. A clamping mechanism may be employed to secure the tubing in the through hole 32. The clamping mechanism may be a threaded shaft translatable through an end cap or a threaded hole, as is employed to secure the tubing in the slot 30.

Although both the slot 30 and the through hole 32 are shown as being configured to allow the tubing to be mounted therein perpendicular to the bar 12, the present invention is not so limited as the slot and the through hole may be angled through the body portion 12 to allow the mounting bar 10 to be located on the tubing (e.g., shaft of a microphone stand or the like) at an angle.

As shown in FIG. 5, the ball 48 of the swivel 15 is rotatably disposed in the body portion of the socket 16 and retained therein. The body portion of the socket 16 includes two slots 24 formed in an upper end thereof and extending from a top edge 26, each of the slots being located on opposite sides of the body portion and having a rounded terminal end 34. The retaining lip 36 extends at least part way around the top edge 26 between the two slots 24 and extends radially inward. The slots 24 allow the ball 48 and the threaded stud extending therefrom to move into the slot upon rotation of the ball relative to the socket 16. This configuration permits a tablet coupled to the swivel, via a case, to be positioned at a desired angle relative to the mounting bar 12. The ball 48 is loosely captured between the top edge 26 and the set screw 37.

The threaded stud 18 includes a ring 64 positioned about midway along the length of the stud and a bearing surface 65 on which a washer 45 is received, the washer providing a bearing surface for the receiving plate 22. Upon loosening the threaded knob 33 and turning the ring 64, the upper portion of the threaded stud 18 can be threaded into the receiving plate 22. The threaded portion 66 is shown in FIG. 5 extending distally from the ring 64.

Figure 6:
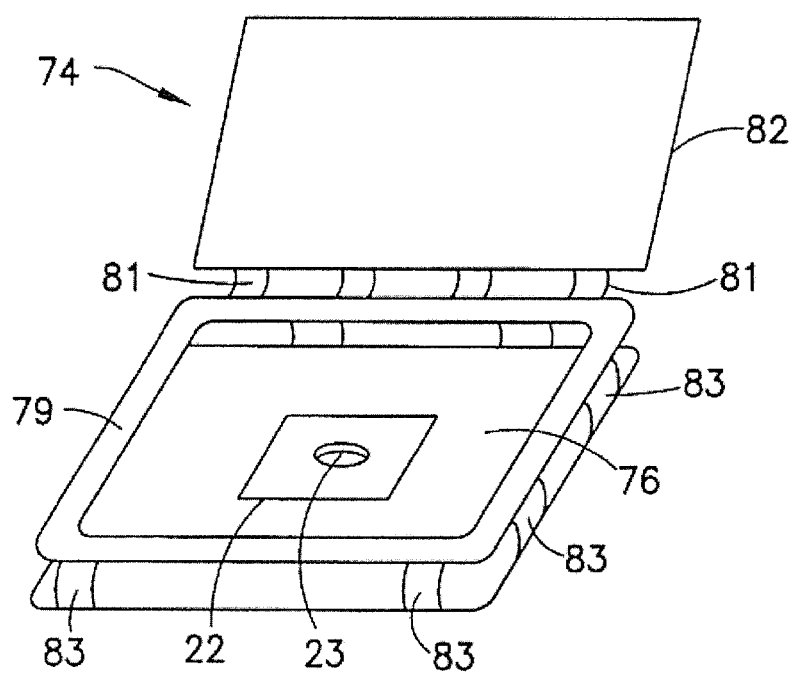
FIG. 6 is a perspective view of a case of the apparatus shown in FIG. 1.

As shown in FIG. 6, the case 74 for receiving the electronic tablet 20 is shown. The case 74 comprises a bottom surface 76 in which the receiving plate 22 with the threaded aperture 23 is located and a top surface 79 coupled to the bottom surface at a suitable number of points along the edges of each of the top and bottom surfaces. The receiving plate 22 may be internal to and/or integrally formed with the bottom surface 76 or coupled thereto using any suitable means. The top surface 79 has a cut out portion through which the tablet 20 can be accessed.

The coupling of the bottom surface 76 to the top surface 79 may be via elastic members 83, as is shown, with the elastic members being located so as to allow the tablet to be slid between the bottom surface 76 and the top surface 79. However, the present invention is not limited to the use of elastic members 83 to couple the bottom surface 76 to the top surface 79, as any suitable means of retaining the top surface 79 on the bottom surface 76 may be used. In some embodiments, the top surface 79 may be replaced in its entirety by elastic members stretching from one edge of the bottom surface 76 to an opposing edge of the bottom surface such that a tablet can be held on the bottom surface by the elastic members. A cover or flap 82 may be coupled to either the top surface 79 or the bottom surface 76 via living hinges 81. The present invention is not limited to a cover or flap having hinges, however, as the cover may be defined by a member that slides relative to the top surface 79 to close the case 74.

Figure 7:
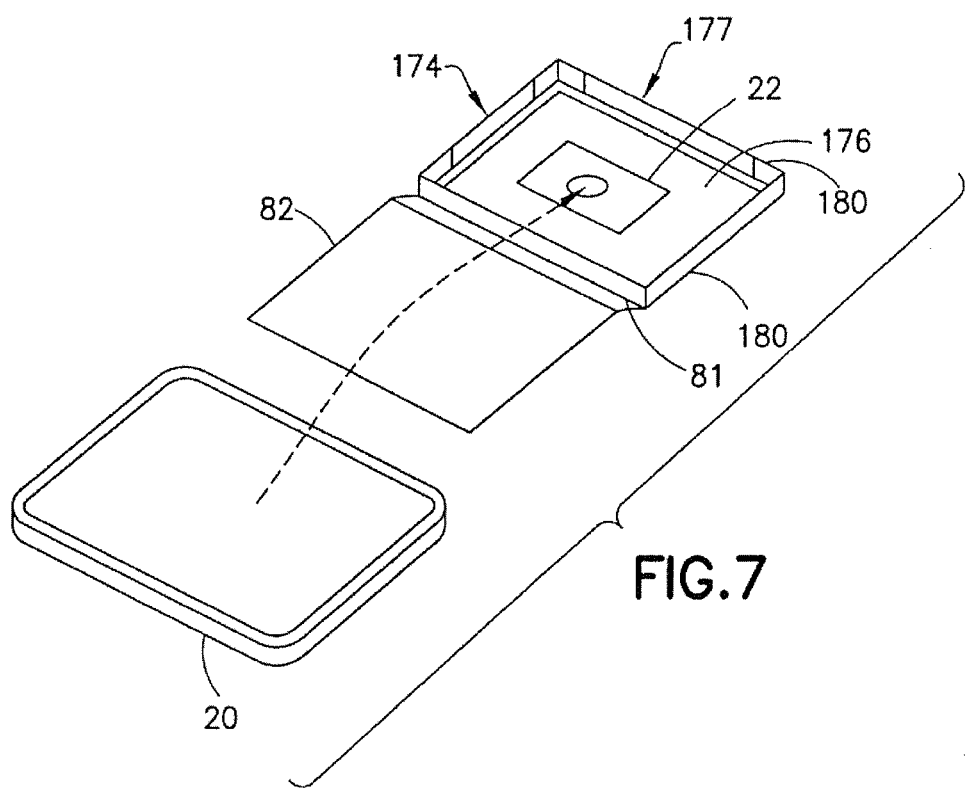
FIG. 7 is a perspective view of a case in accordance with one embodiment of the present invention for use with the apparatus shown in FIG. 1.

The present invention is not limited to the system 10 using the case 74 to mount the electronic tablet 20. In another embodiment as shown in FIG. 7, the tablet 20 may be mounted and transported in a case 174 defined by sides 180 and a bottom surface 176 in which the receiving plate 22 is mounted (e.g., using rivets or the like), stitched, or integrally formed to define a tablet retaining portion 177. Any configuration of the case 174 may have a living hinge 81 coupling a flap 82 or the like to the case, the flap being movable between an open position wherein a display screen of the electronic tablet 20 is viewable and a closed position wherein a portion of the flap covers the tablet display.

Figure 8:
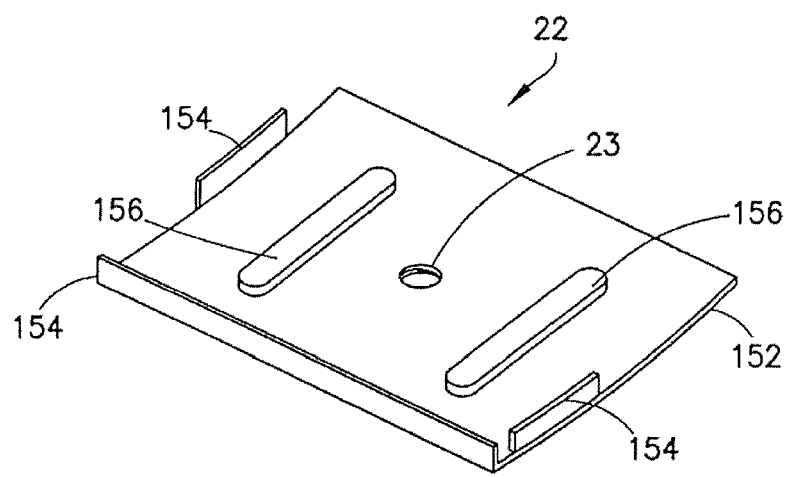
FIG. 8 is a perspective view of a case in accordance with one embodiment of the present invention for use with the apparatus shown in FIG. 1.

In another embodiment as shown in FIG. 8, the tablet 20 may be snapplingly received directly on the receiving plate 22, the receiving plate being defined by a substantially flat member having the threaded aperture 23 extending at least partially into a lower surface 152 thereof or extending therethrough, as shown, with tabs 154 protruding substantially perpendicularly from edge portions of the lower surface 152. Each tab is sized and configured to snappingly engage a top edge portion of the tablet 20. The lower surface 152 also includes raised surfaces 156, which allow the edge portions of the lower surface to be bent upward to allow the tabs 154 to snappingly engage the electronic tablet 20. The threads 66 on the stud 18 are threadedly receivable in the threaded aperture 23. Although several embodiments of cases having retaining plates have been disclosed, the present invention is not limited in this regard. A person of ordinary skill in the art and familiar with this disclosure will understand that many different configurations of the case having a receiving plate for coupling to the swivel may be employed in the present invention.

Figure 9:
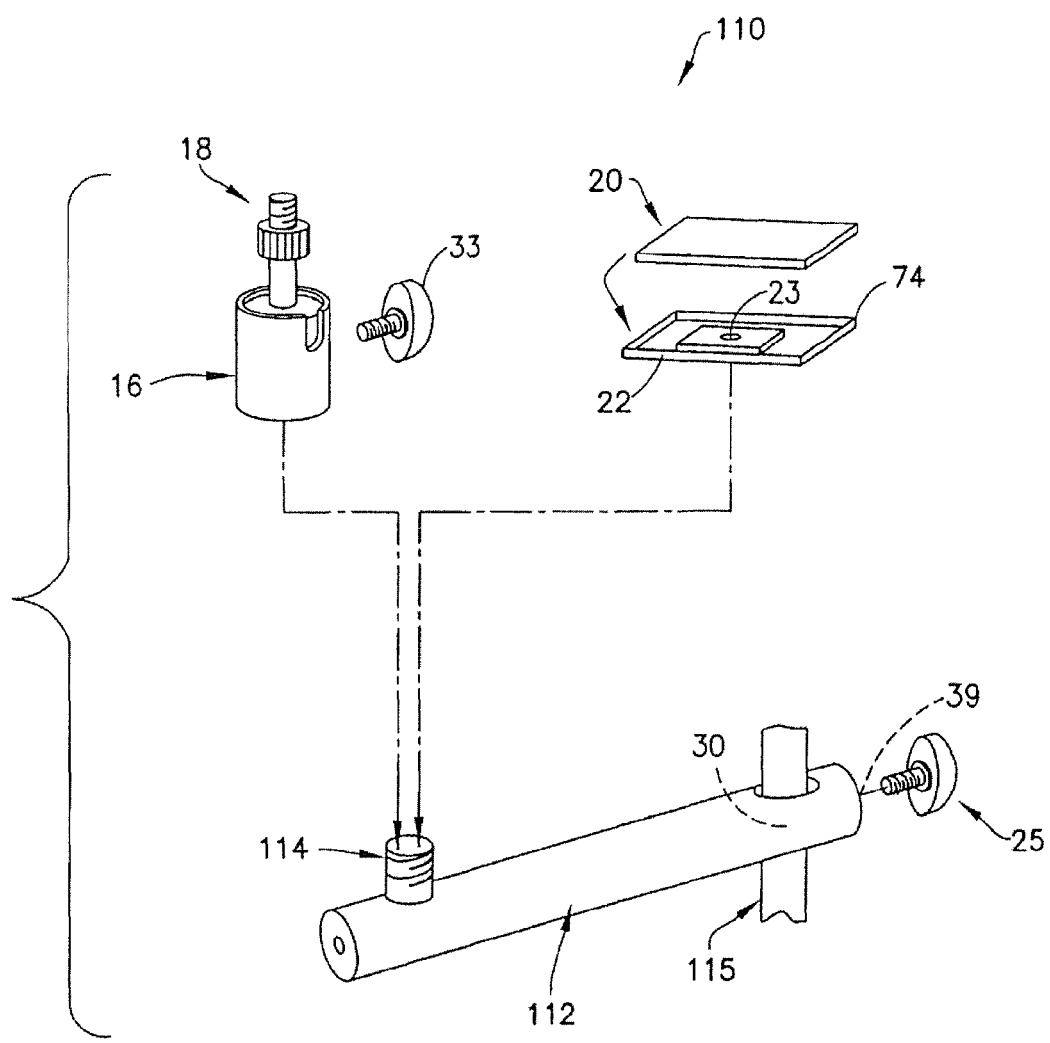
FIG. 9 is an exploded perspective view of an apparatus for supporting a tablet in accordance with one embodiment of the present invention.

As shown in FIG. 9, an alternate embodiment of apparatus for supporting a tablet is designated generally by the reference number 110 and is hereinafter referred to as "apparatus 110." The apparatus 110 is similar to apparatus 10, however apparatus 110 omits a mounting post as used with apparatus 10. The apparatus 110 comprises a mounting bar 112 having a lug 114 protruding therefrom. The lug 114 is integrally formed with the mounting bar 112, for example, by being welded thereon. An end of the lug 114 is threaded. Accordingly, any element suitably configured with receiving threads, including but not limited to, the socket 16 and the receiving plate 22, can be coupled to the lug 114. In this system 110, the slot 30 may be utilized to attach the mounting bar 112 to an existing support 115 such as a microphone stand or the like. A clamping mechanism 25 may be utilized to secure the mounting bar 112 to the existing support 115.

Figure 10:
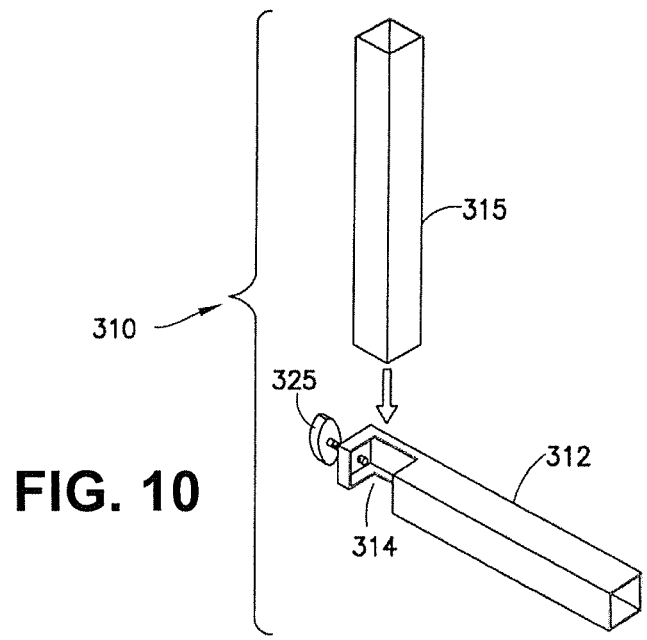
FIG. 10 is a perspective view of a mounting bar in accordance with one embodiment of the present invention.
Figure 11:
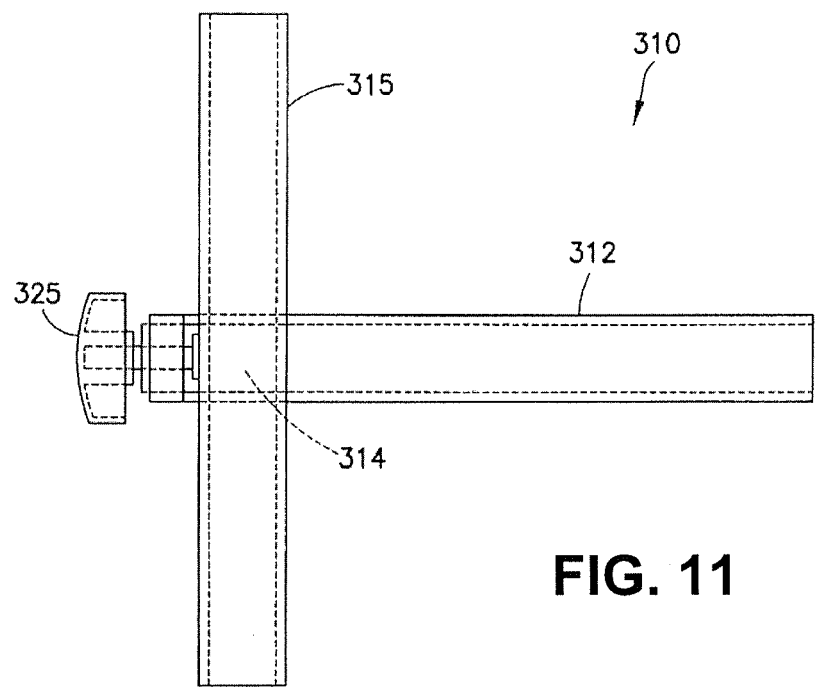
FIG. 11 is a view of the mounting bar shown in FIG. 10.

In reference to FIGS. 10-11, another embodiment of the mounting bar is shown. A mounting bar generally designated by the reference number 310 includes a body portion 312 defining a slot 314 adjacent an end of the body portion. The body portion 312 is cut or otherwise formed such that the slot 314 is defined by substantially straight wall portions defined in part by right angles and square corners. As illustrated in FIG. 10, the slot 314 is capable of receiving a bar or tube 315 similarly configured (straight wall portions defined in part by right angles and square corners, the straight wall portions being complementary to the wall portions of the slot 314). A clamping mechanism 325 (similar to clamping mechanism 25 described above) is positioned in an end of the body portion 312 to urge the tube 315 against at least one wall defining the slot 314 to releasably clamp the tube into the slot 314, as illustrated in FIG. 11.

The body portion is not limited to being straight, as shown in FIGS. 1, 10, Although the tubing is illustrated herein as having a round cross-sectional geometry and an angular (rectangular) cross-sectional geometry, the present invention is not so limited, as the tubing can have a cross-sectional geometry that is elliptical or any other shape.

Figure 12:
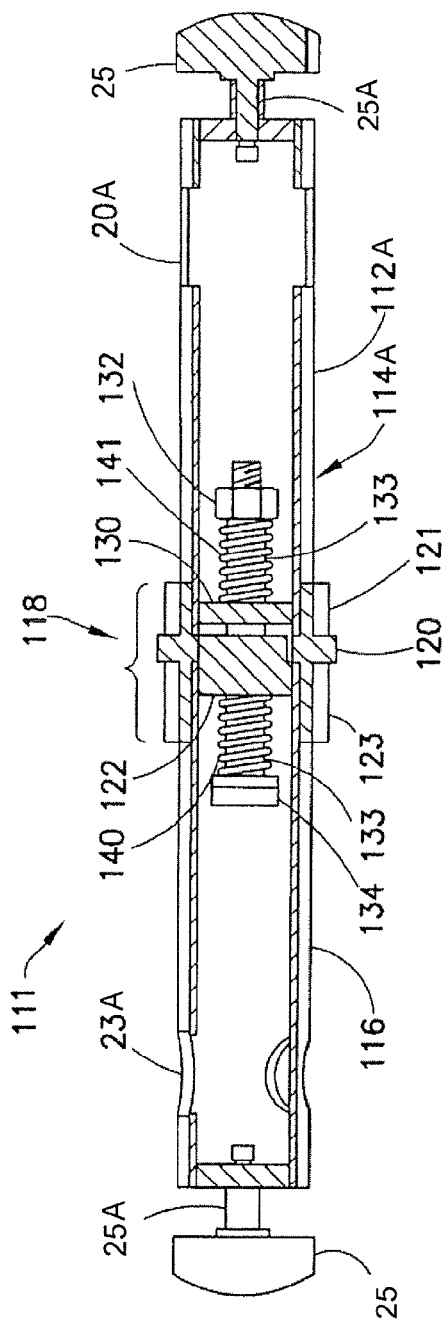
FIG. 12 is a cross sectional view of a mounting bar in accordance with one embodiment of the present invention.
Figure 13:
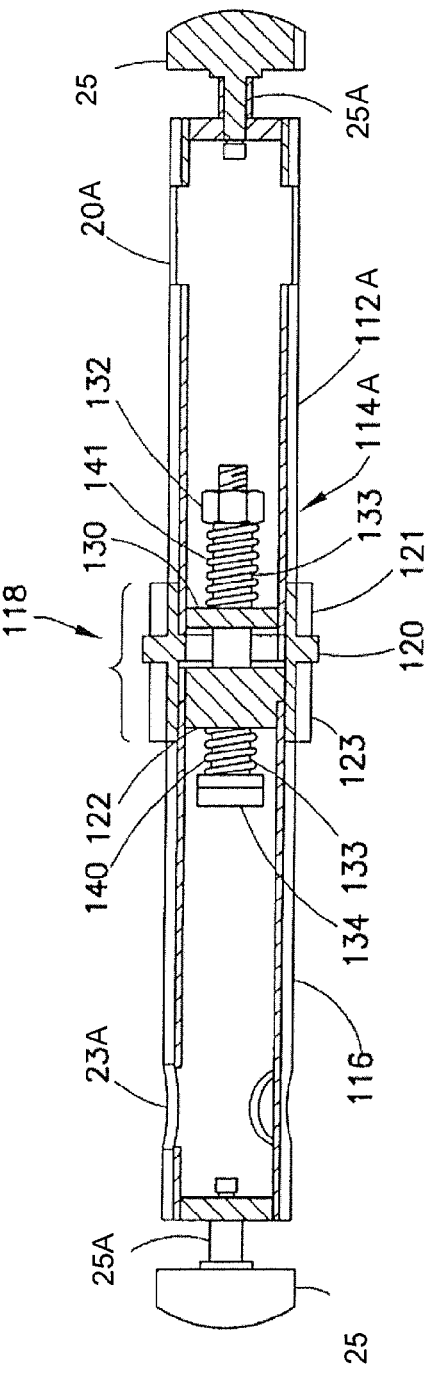
FIG. 13 is a cross sectional view of the mounting bar shown in FIG. 12.
Figure 14:
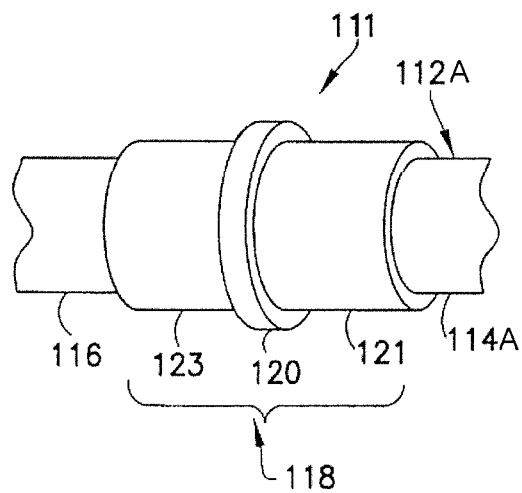
FIG. 14 is a perspective view of a portion of the mounting bar shown in FIG. 13.

As shown in FIGS. 12-14, an alternate embodiment of the bar is designated generally by the reference number 111 and is hereinafter referred to as "bar 111." Bar 111 comprises a body portion 112A defined by a first body portion 114A axially coupled to a second body portion 116 via a selectively-engageable splined assembly 118. The first body portion 114A includes a slot 20A as defined above with regard to FIG. 1 (and/or a through hole 23A) as well as a knob 25 and a threaded shaft 25A. The splined assembly 118 allows the first body portion 114A to be rotated relative to the second body portion 116, thereby allowing a device (e.g., a microphone, sheet music holder, light, or the like) mounted on the second body portion 116 to be adjustably positionable.

The splined assembly 118 is defined by an outer gear 120 having a first sleeve 121 extending from one side thereof over a portion of the first body portion 114A and a second sleeve 123 extending from the other side thereof in an opposing direction over a portion of the second body portion 116, as shown in FIG. 14. The first body portion 114A is received in and supported by the first sleeve 121, and the second body portion 116 is received in and supported by the second sleeve 123. The outer gear is engageable with an inner gear 122 mounted to an end of the second body portion 116 proximate the splined assembly 118, as shown in the embodiment of FIGS. 12-14. Both the outer gear 120 and the inner gear 122 are also slidably mounted to a shaft 133 coupled to the first body portion 114A. The shaft 133 extends through the outer gear 120, the inner gear 122, and a spring plate 130 mounted to an end of the first body portion 114A proximate the splined assembly 118. A first spring 140 is located on the shaft 133 between a head 134 of the shaft and the inner gear 122. A second spring 141 is also located on the shaft 133 between a nut 132 threaded on an end of the shaft 133 opposite the head 133 and the spring plate 130.

During operation, the first and second body portions, 114A and 116 respectively, can be pulled away from one another, thereby disengaging the inner gear 122 from the outer 120. The first and second body portions, 114A and 116 respectively, can then be rotated relative to one another. Once positioned in a desired location, the first spring 140 and the second spring 141 urge the outer and inner gears, 120 and 122, into engagement with one another, releasably fixing the position of the first and second body portions relative to one another.

Figure 15:
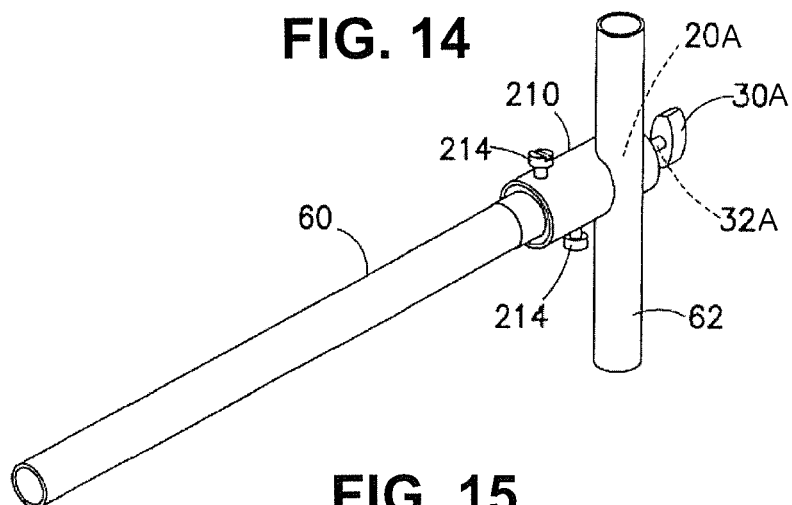
FIG. 15 is a perspective view of a mounting bar in accordance with one embodiment of the present invention.
Figure 16:
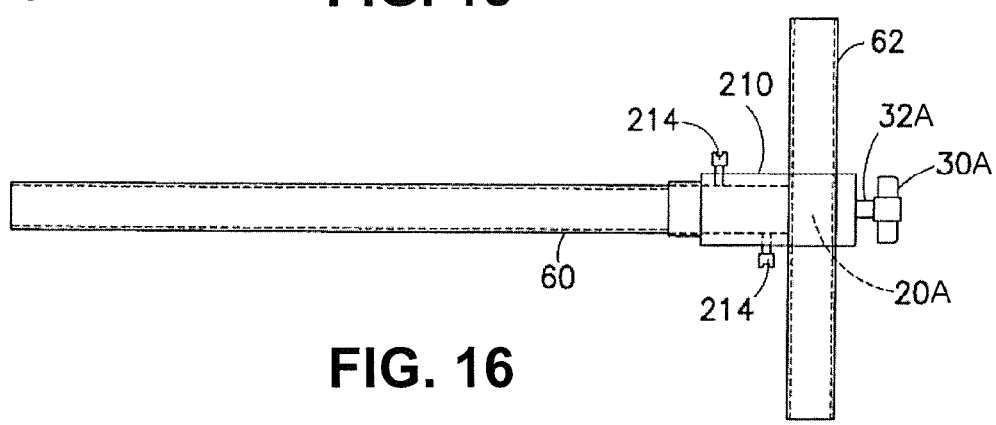
FIG. 16 is a view of a mounting bar shown in FIG. 15.

In reference to FIG. 15-16, the mounting bar may be defined by a short sleeve, shown at 210, appropriately sized to enable the sleeve to be slidably positioned over the end of a first tube 60 such as a horizontal bar or an upright member on a legged stand or base. The sleeve is open on one end having clamping mechanisms 214 to allow the sleeve to be secured to the first tube 60. The clamping mechanisms 214 may be finger-actuatable, as shown, or they may comprise hex head screws or the like. The knob 30A and threaded shaft 32A are located on the sleeve to allow the bar 210 to receive and clamp a second tube 62 in the slot 20A. Suitable devices such as sheet music holders, microphones, lights, or the like can be mounted on the second tube 62.

Figure 17:
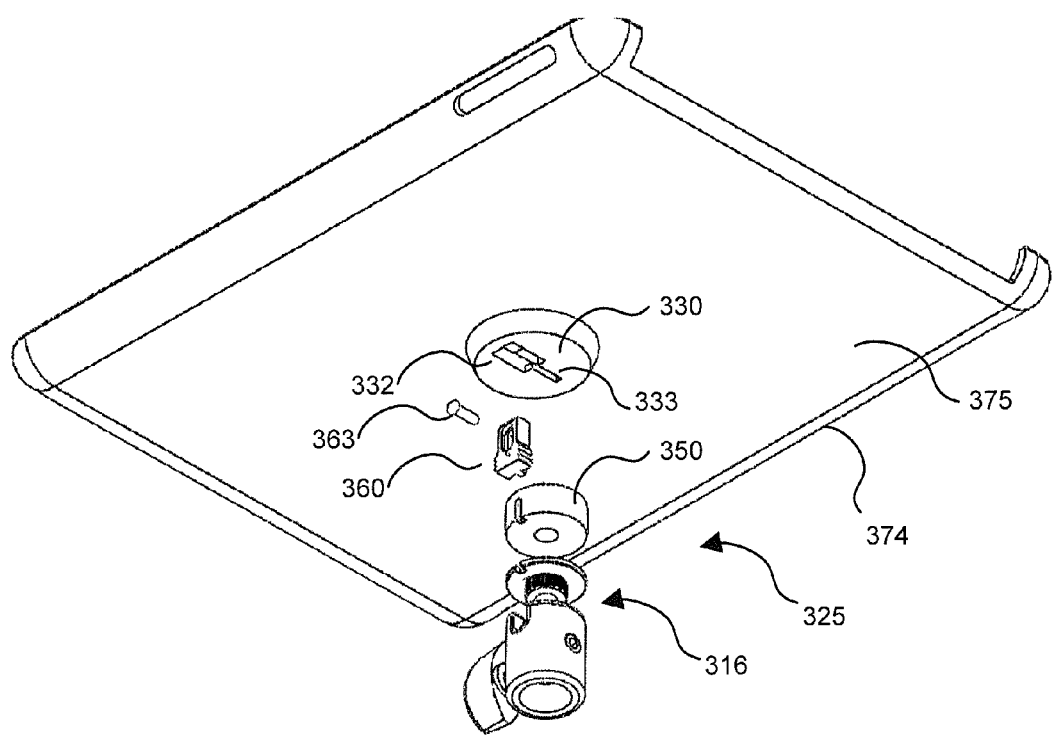
FIG. 17 is an exploded perspective view of a portion of an apparatus for supporting a tablet in accordance with one embodiment of the present invention.
Figure 18:
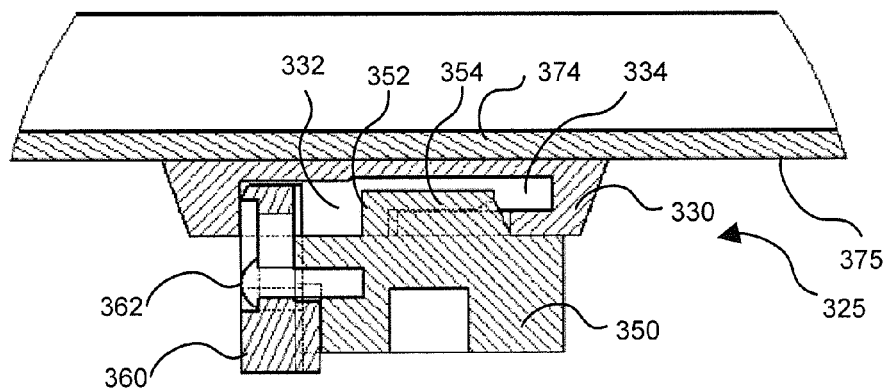
FIG. 18 is a cross sectional front view of a portion of the apparatus shown in FIG. 17.
Figure 19:
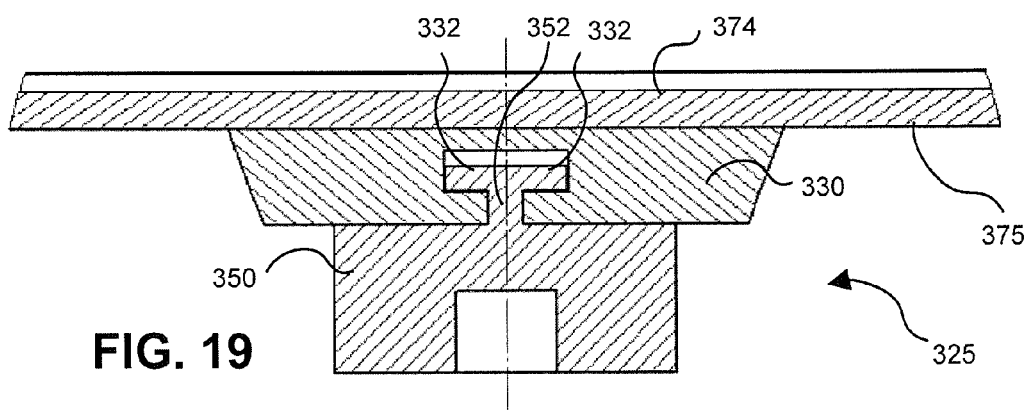
FIG. 19 is a cross sectional side view of a portion of the apparatus shown in FIG. 17.
Figure 20:
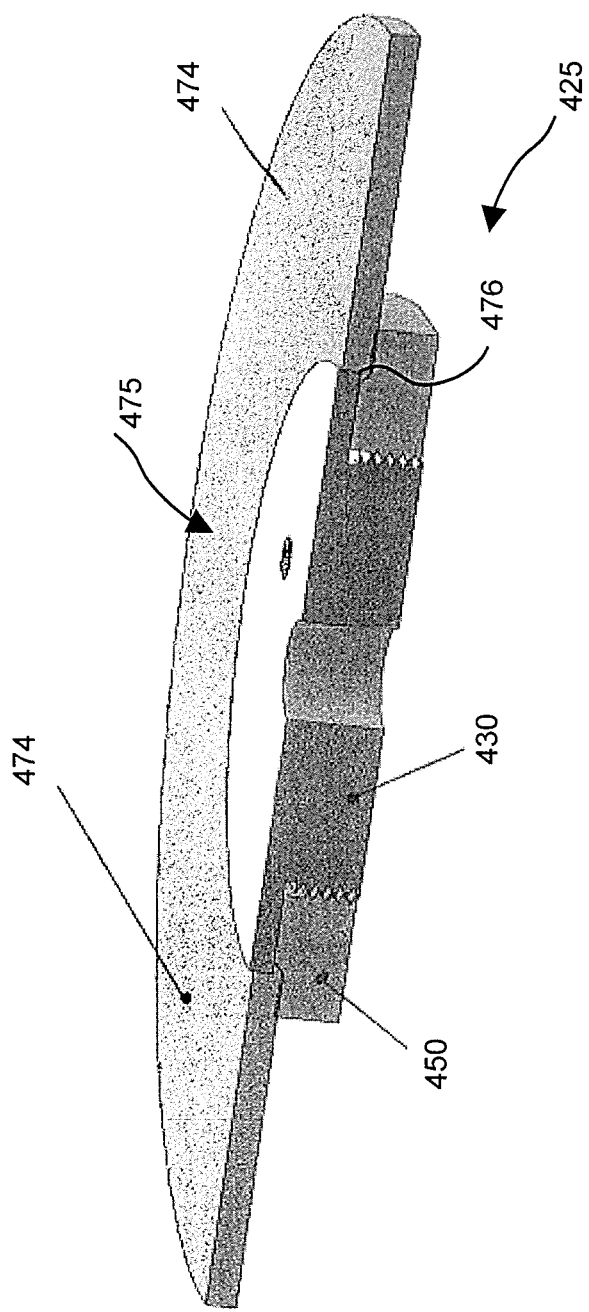
FIG. 20 is a perspective view of an anti-rotation male boss (screw) and nut (locking ring) positioned in a cover.
Figure 22:
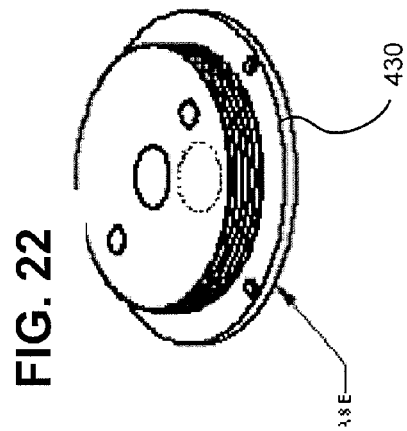
FIG. 22 is a top perspective view of the screw of FIG. 20.
Figure 23:
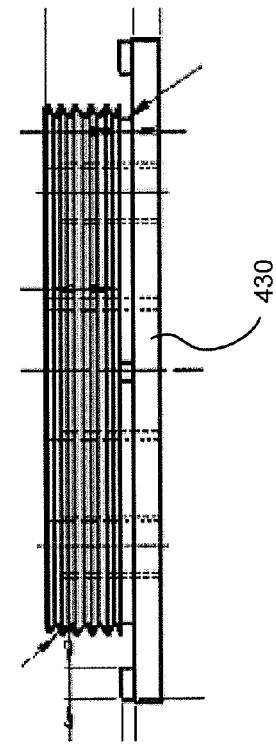
FIG. 23 is a side view of the screw of FIG. 20 showing the locking tabs.
Figure 21:
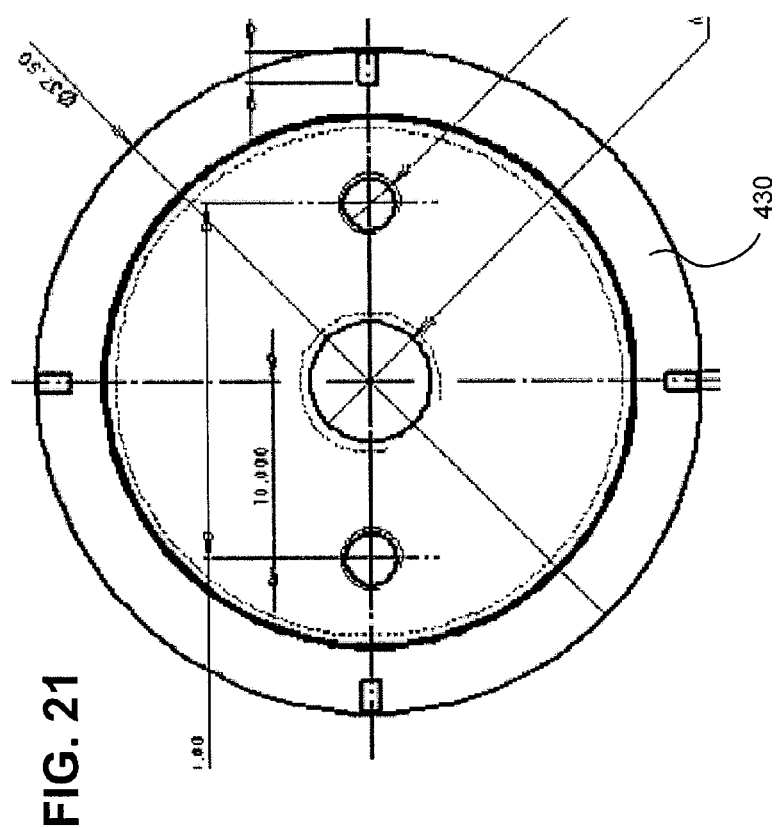
FIG. 21 is a top view of the screw of FIG. 20.
Figure 25:
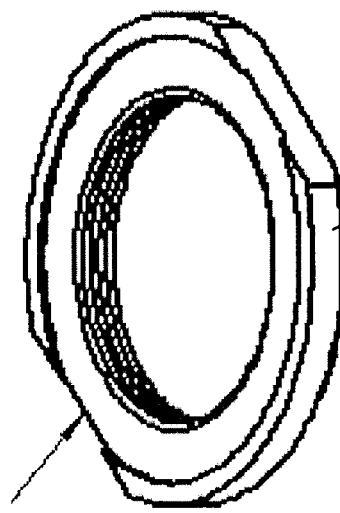
FIG. 25 is a perspective view of the nut of FIG. 20 showing a raised lip.
Figure 26:
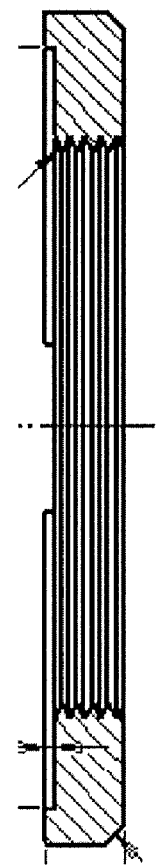
FIG. 26 is a side view of the nut of FIG. 20.
Figure 24:
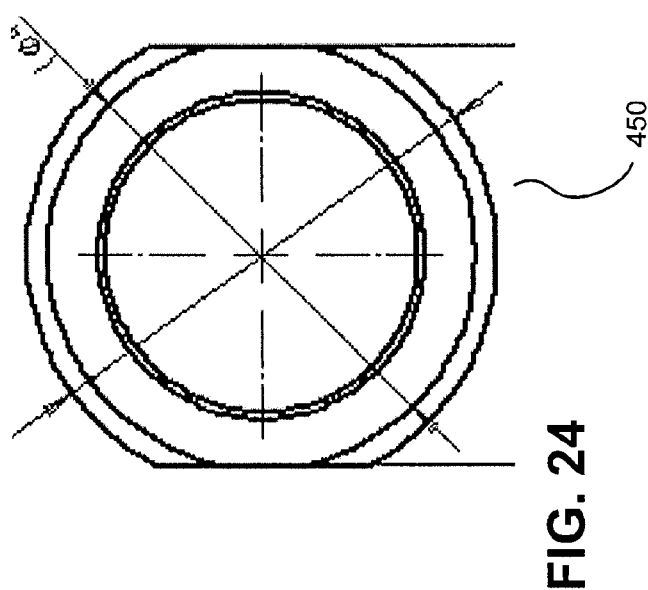
FIG. 24 is a top view of the nut (locking ring) of FIG. 20.

In another embodiment of the present invention illustrated in FIGS. 17-19, a quick release connection 325 between the case 374 and the swivel 316 is employed to facilitate rapid release or retention of the case 374 relative to the swivel. A first mounting boss 330 is coupled to a bottom surface 375 of the case. It should be understood that the first mounting boss 330 may be integral to the case, although the present invention is not limited in this regard. The first mounting boss 330 defines female slot 332 in a bottom surface thereof. The first mounting boss 330 further defines at least one retention tab 333 that extends parallel to the bottom surface 375 and forms a cavity 334 in the first mounting boss. The cavity 334 is in communication with the female slot 332.

The connection 325 includes a second mounting boss 350 coupled to the swivel 316. The second mounting boss 350 includes a male locking device 352. The male locking device 352 extends from a surface of the second mounting boss 350 in a direction perpendicular to the surface of the second mounting boss. A distal end 354 of the male locking device extends parallel to the surface of the second mounting boss 350 and is configured to be received in the cavity 334 adjacent to the female slot 332.

To connect the first mounting boss 330 to the second mounting boss 350, and thus the case 374 to the swivel 316, the male locking device 352 is inserted upward into the female slot 332 and translated relative thereto along an axis parallel to the surface 375 of the case 374. In this manner the distal end 354 of the male locking device 352 is disposed in the cavity 334 formed by the one or more retention tabs 333, thereby fixing the first mounting boss 330 relative to the second mounting boss 350. The connector further includes a thumb lock 360 to inhibit unintended release of the connection. The thumb lock 360 is slideably coupled to the second mounting boss 350 via a pin 363. After the distal end 354 of the male locking device 352 is received in the cavity 334, the thumb lock 360 is translated upward so that a portion of the thumb lock is received in the female slot 332, thereby retaining the distal end 334 of the male locking device 352 in the cavity 334, and inhibiting removal thereof.

In reference to FIGS. 20-26, another embodiment of a connector 425 for releasably coupling a case 474 to a swivel, or some other element, is shown. The case 474 defines an aperture 475 in a portion thereof. The aperture defines a lip 476 extending radially inward from an edge of the aperture 475. The lip 476 extends along a least a portion of the edge defining the aperture 475. The connector to include a first mounting boss 430. The first mounting boss 430 is configured so that a portion thereof extends entirely through the aperture, while a portion thereof is retained in the aperture 475 via the lip. In the embodiment shown in FIG. 20, an upper surface of the first mounting boss is substantially flush with an upper surface of the case 474. The portion of the first mounting boss 430 that extends entirely through the aperture has a cylindrical outer surface in a plane parallel to a bottom surface of the case 474. The cylindrical outer surface is threaded. The connector 425 includes a second mounting boss 450 that defines an opening that is configured to threadably engage with the threaded outer surface of the first mounting boss.

Figure 27:
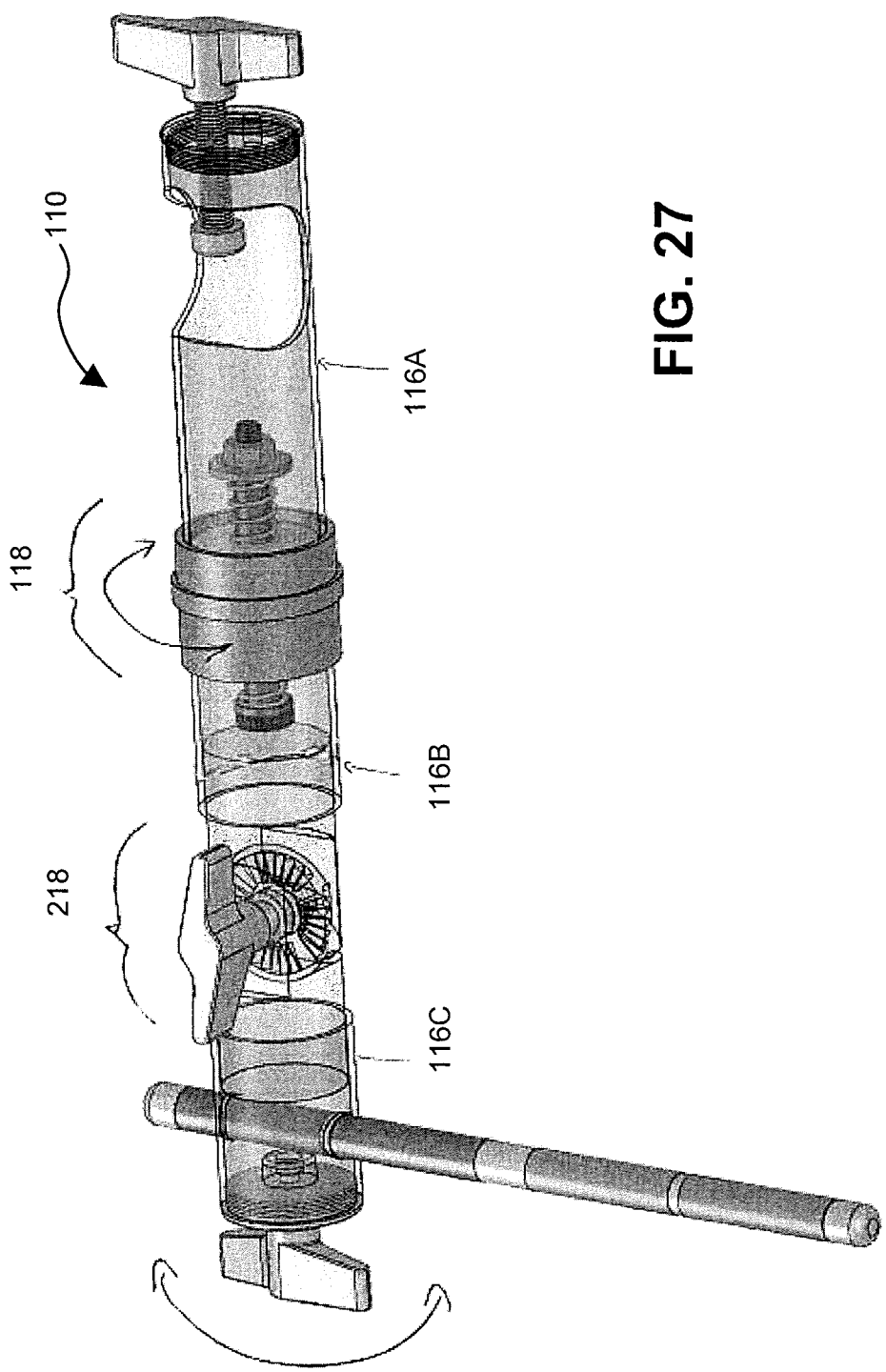
FIG. 27 is a perspective view of a mounting bar having a splined assembly in accordance with one embodiment of the present invention.

In reference to FIG. 27, another embodiment of a mounting bar 110 in accordance with the present invention is shown. The mounting bar 110 includes a first splined assembled 118, described above, to enable selective rotation of a first section 116A relative to a second section 116B about a longitudinal axis of the mounting bar 110. The mounting bar 110 includes a second splined assembly 218 to enable selective rotation of the second section 116B relative to the third section 116C about an axis of rotation perpendicular to the longitudinal axis of the mounting bar 110.

In reference to FIGS. 28-35, an apparatus 500 for supporting a tablet in accordance with one embodiment of the present invention is illustrated. The apparatus 500 includes a mounting bar 510 that extends along a longitudinal axis between a first end 520 and a second end 530. The mounting bar 510 defines an elliptical outer surface in a cross sectional plane perpendicular to the longitudinal axis. The mounting bar 510 is hollow and has an inside diameter and an outside diameter. The mounting bar 510 defines a mounting slot 540 between the first end 520 and the second end 530. The mounting slot 540 comprises a bottom surface 542 and a first radius of curvature 544 extending from the bottom surface. The first radius of curvature 544 has a first bearing edge defining a first elliptically enveloping surface and a second bearing edge defining a second elliptically enveloping surface. The first bearing edge and the second bearing edge converge to a leading edge (hidden in FIGS. 28-37). The leading edge is configured to facilitate retention of an item received in the mounting slot 540 against the first and second bearing edges. The mounting bar 510 further comprises a first clamping mechanism 512, a portion of which extends into the first end 520 of the mounting bar towards the first radius 544 of curvature of the mounting slot 540. The first clamping mechanism 512 is configured to engage an item having an elliptical outer surface positioned in the mounting slot 542, thereby urging the elliptical outer surface of the item against the first radius of curvature 544 to releasably fix the mounting bar 510 relative to the item.

The clamping mechanism 512 comprises a knob 514 and a threaded shaft 516 (identified in FIG. 31A) extending therefrom. The shaft 516 is threadably engaged with the first end 520 of the mounting bar 510 and extends along an axis parallel to the longitudinal axis of the mounting bar 510. A distal end 517 of the shaft 516 extends into the mounting slot 540. A rotation of the knob 514 of the first clamping mechanism 512 relative to the mounting bar 510 in a first direction translates the distal end 517 of the shaft 516 toward the first radius of curvature 544 the mounting slot 540. A rotation of the knob 514 of the first clamping mechanism 512 relative to the mounting bar 510 in a second direction translates the distal end 517 of the shaft 516 away from the first radius of curvature 544 of the mounting slot 540.

In the embodiment disclosed in the FIGS. 28-31C, a push pad 522 is coupled to the distal end 517 of the shaft 516 of the first clamping mechanism 512. The push pad 522 defines an elliptical surface 521 configured to engage an item received in the mounting slot 540. In the disclosed embodiment, an inside surface the mounting bar 510 defines a guide slot 532 extending along a length of the mounting bar 510 proximate to the push pad 522. The push pad 522 comprises a tab 524 that is configured to travel in the guide slot 532 when the push pad 522 is translated along the longitudinal axis of the mounting bar 510 via a rotation of the knob 514 in the first or second direction, thereby facilitating retention of the push pad 522 in a favorable orientation for retaining the item in the mounting slot 540. In the embodiment disclosed in the FIGS., the push pad is threadably engaged to a the distal end 517 of the shaft 516.

In reference to FIGS. 28-31A, a locking member 550 is coupled to the mounting bar 510 to close the mounting slot 540. In the embodiment shown, the locking member 550 is coupled to the mounting bar by a plurality of screws 552. In the embodiment shown, the screws have customized heads, to inhibit removal thereof by conventional tools. In this manner, it is possible to retain the locking member 550 on the mounting bar 510. The locking member 550 permits the mounting bar to be coupled to public object, for example a shopping cart, while inhibiting easy removal thereof, thus deterring theft.

Figure 28:
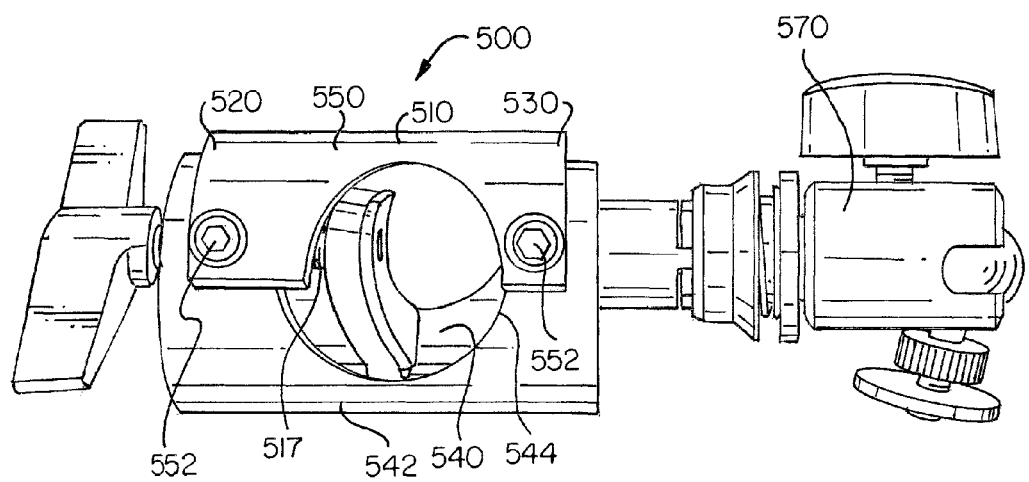
FIG. 28 is view of an apparatus for supporting a tablet in accordance with one embodiment of the present invention.
Figure 29:
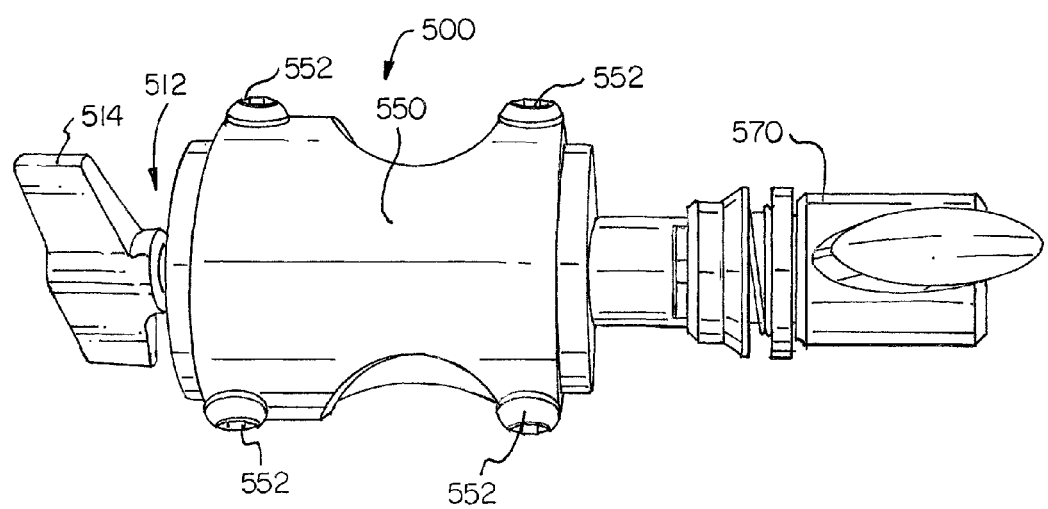
FIG. 29 is a top view of the apparatus shown in FIG. 28.
Figure 30:
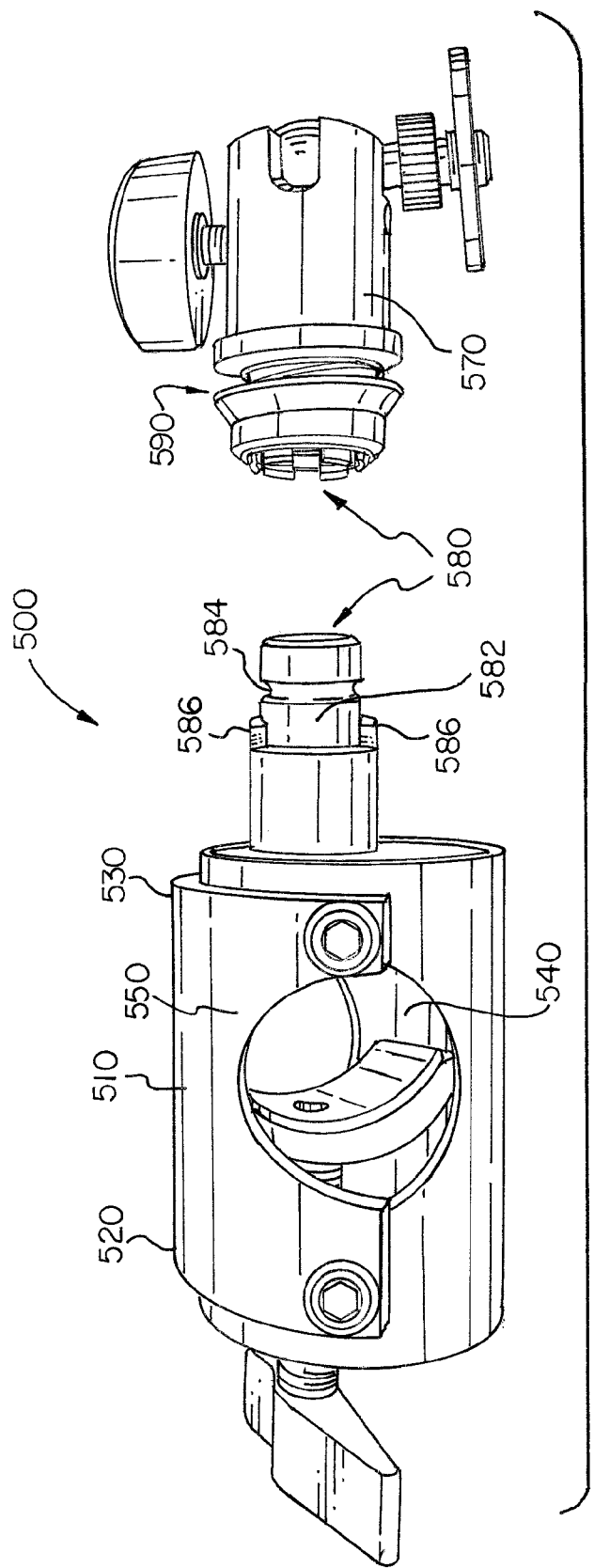
FIG. 30 is a partial exploded view of the apparatus shown in FIG. 29.
Figure 31A:
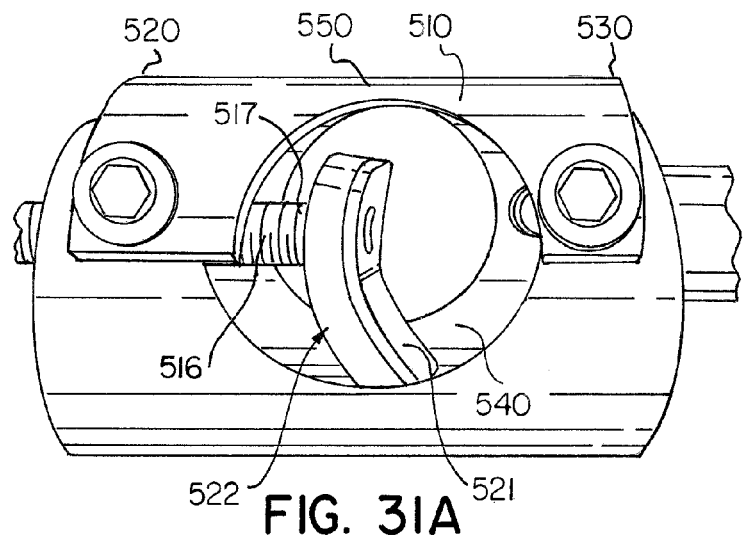
FIG. 31A is a view of a portion of the apparatus shown in 30.
Figure 31B:
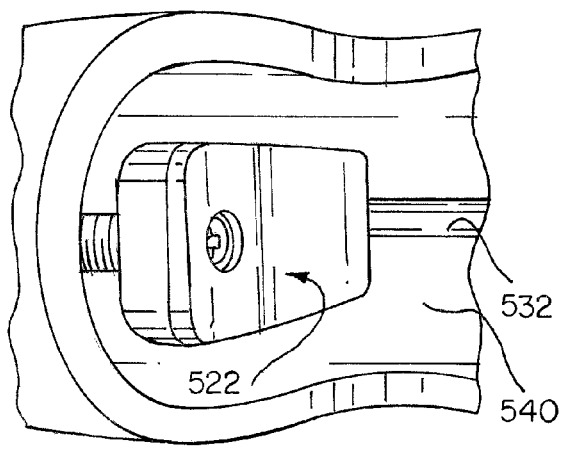
FIG. 31B is a top view of a mounting slot of the apparatus shown in FIG. 30.
Figure 31C:
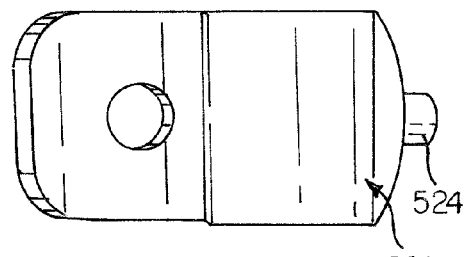
FIG. 31C is a top view of a contoured pad of the apparatus shown in FIG. 30.
Figure 32:
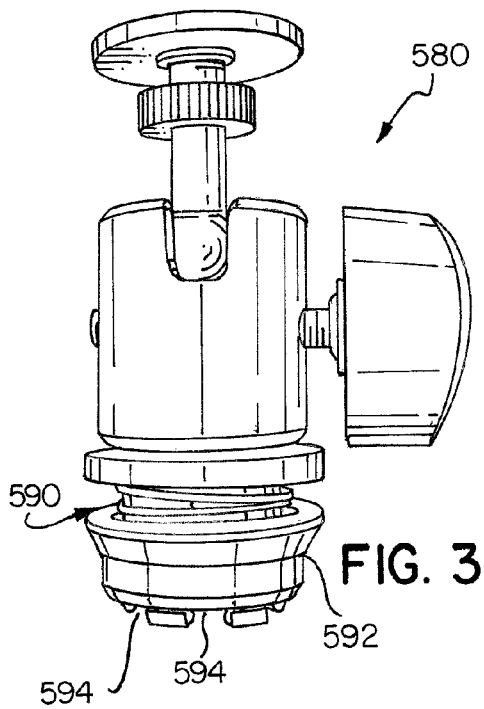
FIG. 32 is a front view of a portion of the apparatus shown in FIG. 30 in which a quick release connector in accordance with one embodiment of the present invention is shown.
Figure 33:
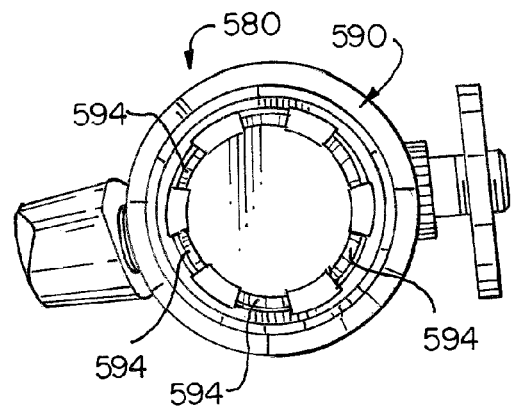
FIG. 33 is a bottom view of quick release connector shown in FIG. 32.
Figure 34:
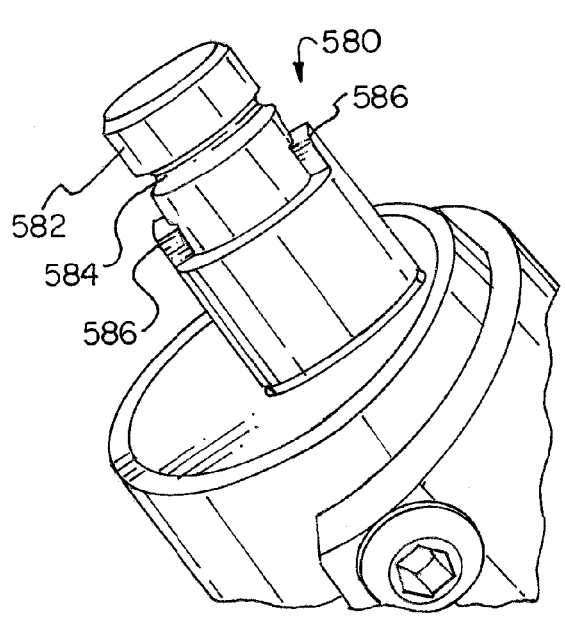
FIG. 34 is a perspective view of a male portion of the quick release connector.
Figure 35:
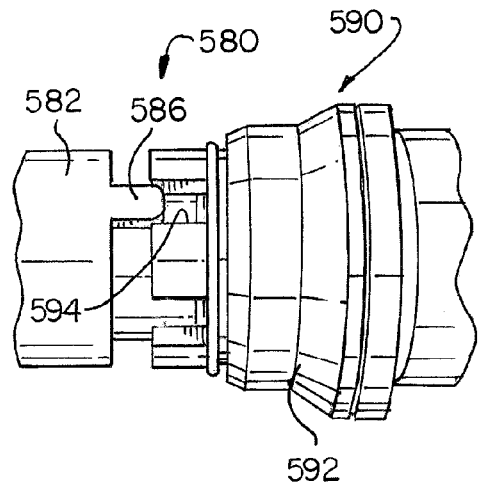
FIG. 35 is a perspective view of a male portion of the quick release connector.

In reference to FIG. 28-30, the swivel 570 is coupled to the second end 530 of the mounting bar 510 by a quick release connector 580. The quick release connector 580 is illustrated in detail in FIGS. 32-35. The connector 580 includes a male portion 582 that extends distally from the second end 530 of the mounting bar 510. The male portion 582 is generally cylindrical about an axis parallel to the longitudinal axis of the mounting bar 510. The male portion 582 defines an annular indentation 584 proximate to its distal end. The male portion 582 further defines at least one locking member 586 that extends radially outward from a surface of the male portion 582 and extends along an axis thereof.

The connector 580 further includes a female portion 590 configured to receive the male portion. A ring 592 encloses an outer portion of the female portion 590. By moving the ring in a first direction, a plurality of ball bearings disposed in channels on an inner surface of the female portion 590 are provided with additional clearance thereby enabling a coupling of the male portion 582 with the female portion 590. After the coupling, the ring 592 is released thereby biasing the ring toward a distal end of the female portion 590, and thereby forcing the ball bearings into the annular indentation fixing the mounting bar 510 relative to the swivel 570 along the longitudinal axis.

The female portion 590 includes a plurality of indentions 594 extending radially outward from an inner surface of a receiving cavity defined by the female portion. When the male portion 582 is coupled with the female portion 590, the at least one locking member is receiving in one of the plurality of indentations. The interlocking of the locking member 586 is received in one of the plurality of the indentations 594 inhibits rotation of the swivel 570 relative to mounting bar 510 about the longitudinal axis. In this manner, it is possible to facilitate a more sturdy support for a tablet using the apparatus in accordance with the present invention.

Although the apparatus has been disclosed in reference to certain embodiments, the present invention is not limited in this regard. For example, the present invention may reside in other embodiment of an apparatus for supporting a tablet that are supported by this disclosure. In addition, many of the elements disclosed are useful on their own accord, separate from the broader configuration of the disclosed support apparatuses.

Although the invention has been described with reference to a particular arrangement of parts, features and the like, these are not intended to exhaust all possible arrangements or features, and indeed many other modifications and variations will be ascertainable to those of skill in the art.

What is claimed is:

1. An apparatus for supporting a tablet, comprising:
a case configured to receive the tablet, the case having a receiving plate;
a swivel comprising a socket and a ball disposed and retained in the socket, the ball being rotatable relative to the socket and having a stud extending from a surface of the ball, a distal end of the stud being coupled to the receiving plate;
a mounting post extending along a longitudinal axis between a first end and a second end, the first end being coupled to the swivel;
a mounting bar extending along a longitudinal axis between a first end and a second end, the mounting bar defining an elliptical outer surface in a cross sectional plane perpendicular to the longitudinal axis, the mounting bar being hollow and having an inside diameter and an outside diameter, the mounting bar having a through hole proximate to the second end, the second end of the mounting post being received in the through hole and releasably fixed relative thereto, the mounting bar defining a mounting slot, the mounting slot comprising:
a bottom surface and a first radius of curvature extending from the bottom surface, the first radius of curvature having a first bearing edge defining a first elliptically enveloping surface and a second bearing edge defining a second elliptically enveloping surface, the first bearing edge and the second bearing edge converging to a leading edge, the leading edge and the first and second bearing edges being configured to facilitate a retention of an item received in the mounting slot;
the mounting bar further comprising a first clamping mechanism, a portion of which extends into the first end of the mounting bar towards the first radius of curvature of the mounting slot;
wherein the first clamping mechanism is configured to engage an item having an elliptical outer surface positioned in the mounting slot, thereby urging the elliptical outer surface of the item against the first radius of curvature to releasably fix the mounting bar relative to the item by urging the item against the bearing edges and the leading edge.

2. The apparatus of claim 1, wherein the first clamping mechanism comprises a knob and a threaded shaft extending therefrom, and wherein the shaft is threadably engaged with the first end of the mounting bar and extends along an axis parallel to the longitudinal axis of the mounting bar, a distal end of the shaft extending into the mounting slot.

3. The apparatus of claim 2, wherein a rotation of the knob of the first clamping mechanism relative to the mounting bar in a first direction translates the distal end of the shaft toward the first radius of curvature of the mounting slot.

4. The apparatus of claim 3, wherein a rotation of the knob of the first clamping mechanism relative to the mounting bar in a second direction translates the distal end of the shaft away from the first radius of curvature of the mounting slot.

5. The apparatus of claim 4, further comprising:
a push pad coupled to a distal end of the shaft of the first clamping mechanism, the push pad defining an elliptical surface configured to engage an item received in the mounting slot.

6. The apparatus of claim 5, wherein an inside surface of the mounting bar defines a guide slot extending along a length of the mounting bar proximate to the push pad, and wherein the push pad comprises a tab extending therefrom, the tab being configured to travel in the guide slot when the push pad is translated along the longitudinal axis of the mounting bar via a rotation of the knob in the first or second direction.

7. The apparatus of claim 4, further comprising:
a second clamping mechanism coupled proximate to the second end of the mounting bar, the second clamping mechanism being configured to releasably fix the mounting post relative to the mounting bar.

8. The apparatus of claim 7, wherein the second clamping mechanism comprises a knob and a shaft extending therefrom, the shaft being threadably engaged with the second end of the mounting bar and extending along an axis parallel to the longitudinal axis of the mounting bar, a distal end of the shaft extending into the through hole.

9. The apparatus of claim 8, wherein a rotation of the knob of the second clamping mechanism relative to the mounting bar in a first direction translates the distal end of the shaft into the through hole to inhibit movement of the mounting post relative to the mounting bar.

10. The apparatus of claim 9, wherein a rotation of the knob of the second clamping mechanism relative to the mounting bar in a second direction translates the distal end of the shaft away from the through hole to facilitate movement of the mounting post relative to the mounting bar.

11. The apparatus of claim 10, further comprising:
a third clamping mechanism configured to selectively fix rotation of the ball relative to the socket.

12. The apparatus of claim 11, wherein the third clamping mechanism comprises a knob and a shaft extending therefrom, the shaft being threadably engaged with the socket.

13. The apparatus of claim 12, wherein a rotation of the knob of the third clamping mechanism relative to the socket in a first direction translates the distal end of the shaft into the socket to inhibit rotation of the ball relative to the socket.

14. The apparatus of claim 13, wherein a rotation of the knob of the third clamping mechanism relative to the socket in a second direction translates the distal end of the shaft out of the socket to facilitate rotation of the ball relative to the socket.

15. An apparatus for supporting a tablet, comprising:
a case configured to receive the tablet,
a swivel comprising a socket and a ball disposed and retained in the socket, the ball being rotatable relative to the socket and having a stud extending from a surface of the ball, a distal end of the stud being coupled to the case;
a mounting bar extending along a longitudinal axis between a first end and a second end, the mounting bar defining an elliptical outer surface in a cross sectional plane perpendicular to the longitudinal axis, the mounting bar being hollow and having an inside diameter and an outside diameter, the swivel being coupled to the second end of the mounting bar, the mounting bar defining a mounting slot proximate to the first end, the mounting slot comprising:
a bottom surface and a first radius of curvature extending from the bottom surface, the first radius of curvature having a first bearing edge defining a first elliptically enveloping surface and a second bearing edge defining a second elliptically enveloping surface, the first bearing edge and the second bearing edge converging to a leading edge, the leading edge configured to facilitate a retention of an item received in the mounting slot;

the mounting bar further comprising a first clamping mechanism, a portion of which extends into the first end of the mounting bar towards the first radius of curvature of the mounting slot;

wherein the first clamping mechanism is configured to engage an item having an elliptical outer surface positioned in the mounting slot, thereby urging the elliptical outer surface of the item against the first radius of curvature to releasably fix the mounting bar relative to the item by urging the item against the bearing edges and the leading edge.

16. The apparatus of claim 15, wherein the first clamping mechanism comprises a knob and a threaded shaft extending therefrom, and wherein the shaft is threadably engaged with the first end of the mounting bar and extends along an axis parallel to the longitudinal axis of the mounting bar, a distal end of the shaft extending into the mounting slot.

17. The apparatus of claim 16, wherein a rotation of the knob of the first clamping mechanism relative to the mounting bar in a first direction translates the distal end of the shaft toward the first radius of curvature of the mounting slot.

18. The apparatus of claim 17, wherein a rotation of the knob of the first clamping mechanism relative to the mounting bar in a second direction translates the distal end of the shaft away from the first radius of curvature of the mounting slot.

19. The apparatus of claim 18, further comprising:
a second clamping mechanism configured to selectively fix rotation of the ball relative to the socket.

20. The apparatus of claim 19, wherein the second clamping mechanism comprises a knob and a shaft extending therefrom, the shaft being threadably engaged with the socket.

* * * * *